(12) United States Patent
Ahn et al.

(10) Patent No.: US 12,172,523 B2
(45) Date of Patent: Dec. 24, 2024

(54) ELECTRONIC DEVICE FOR PROJECTING IMAGE ONTO WINDSHIELD OF VEHICLE AND OPERATING METHOD THEREOF

(71) Applicant: Samsung Electronics Co., Ltd., Gyeonggi-do (KR)

(72) Inventors: Joonseok Ahn, Gyeonggi-do (KR); Jeonghoon Seo, Gyeonggi-do (KR); Daehyoun Byoun, Gyeonggi-do (KR); Woong Lee, Gyeonggi-do (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 308 days.

(21) Appl. No.: 17/684,685

(22) Filed: Mar. 2, 2022

(65) Prior Publication Data

US 2022/0281317 A1 Sep. 8, 2022

Related U.S. Application Data

(63) Continuation of application No. PCT/KR2022/002729, filed on Feb. 24, 2022.

(30) Foreign Application Priority Data

Mar. 2, 2021 (KR) .................. 10-2021-0027489

(51) Int. Cl.
*G06F 3/01* (2006.01)
*B60K 35/00* (2006.01)
(Continued)

(52) U.S. Cl.
CPC .............. *B60K 35/00* (2013.01); *G06F 3/013* (2013.01); *G06T 5/80* (2024.01); *G06V 20/59* (2022.01);
(Continued)

(58) Field of Classification Search
CPC .......... G02B 27/0093; B60K 2360/785; B60K 35/285; G06T 3/18; G06T 5/80; G06F 3/013; G06V 20/59
See application file for complete search history.

(56) References Cited

U.S. PATENT DOCUMENTS 8,485,666 B2 7/2013 Cho
9,694,760 B2 7/2017 Lee
(Continued)

FOREIGN PATENT DOCUMENTS

JP 2002-104017 A 4/2002
JP 2017-185988 A 10/2017
(Continued)

OTHER PUBLICATIONS

Tomoya Tsuruyama, Haruhiko Okumura, Aira Hotta, Takashi Sasaki, Nao Mishima, Multi-Mirror Array Optics for Augmented Reality Devices and Optical Distortion Correction, Mar. 7, 2019, IEEE, 1-6 (Year: 2019).*

(Continued)

*Primary Examiner* — Khoi H Tran
*Assistant Examiner* — Dairon Estevez
(74) *Attorney, Agent, or Firm* — Cha & Reiter, LLC

(57) ABSTRACT

An electronic device and method are disclosed. The electronic device includes a transparent screen, attached to at least a part of the windshield, and configured to refract light of a projection towards a driver of the vehicle, a projector configured to project an image onto the transparent screen, an eye tracking sensor configured to detect a gaze direction of the driver by tracking left and right eyes of the driver, a memory storing a program including one or more instructions for controlling the electronic device, a processor. The processor implements the method, including: altering the image projected onto the transparent screen based at least on
(Continued)

the detected gaze direction, to correct distortion of the image as perceivable by the driver when the image is projected onto the transparent screen.

13 Claims, 19 Drawing Sheets

(51) Int. Cl.
| | | |
|---|---|---|
| *G06T 5/80* | (2024.01) | |
| *G06V 20/59* | (2022.01) | |
| *G06V 40/18* | (2022.01) | |
| *B60K 35/10* | (2024.01) | |
| *B60K 35/60* | (2024.01) | |
| *B60K 35/65* | (2024.01) | |

(52) U.S. Cl.
CPC .............. *G06V 40/18* (2022.01); *B60K 35/10* (2024.01); *B60K 35/60* (2024.01); *B60K 35/65* (2024.01); *B60K 2360/149* (2024.01); *B60K 2360/334* (2024.01); *B60K 2360/785* (2024.01)

(56) References Cited

U.S. PATENT DOCUMENTS

| | | |
|---|---|---|
| 9,772,496 B2 | 9/2017 | Kimura |
| 10,274,726 B2 | 4/2019 | Hickerson et al. |
| 10,510,276 B1 | 12/2019 | Lee |
| 10,703,272 B2 | 7/2020 | Suzuki et al. |
| 11,221,481 B2 | 1/2022 | Kusafuka et al. |
| 11,460,709 B2 | 10/2022 | Liu et al. |
| 2014/0104318 A1* | 4/2014 | Arai .......................... G06T 3/40 345/660 |
| 2016/0209647 A1* | 7/2016 | Fürsich .............. G02B 27/0075 |
| 2016/0240013 A1* | 8/2016 | Spitzer ............... G02B 27/0172 |
| 2016/0325683 A1* | 11/2016 | Hayashi .............. G02B 27/0093 |
| 2016/0377873 A1 | 12/2016 | Kimura |
| 2017/0045740 A1* | 2/2017 | Hirata ................... H04N 9/3164 |
| 2017/0050542 A1* | 2/2017 | Shigeta .................... B60N 2/16 |
| 2017/0054963 A1* | 2/2017 | Kasazumi ............. H04N 13/302 |
| 2017/0160545 A1* | 6/2017 | Sugiyama .............. B60K 35/00 |
| 2017/0299873 A1 | 10/2017 | Hickerson et al. |
| 2018/0157035 A1 | 6/2018 | Fujita |
| 2018/0253907 A1 | 9/2018 | Cashen et al. |
| 2018/0268564 A1 | 9/2018 | Sumikawa et al. |
| 2020/0064640 A1* | 2/2020 | Nagano .................. G09G 3/001 |
| 2020/0290458 A1 | 9/2020 | Sunaga et al. |
| 2020/0292832 A1 | 9/2020 | Liu et al. |
| 2020/0301138 A1* | 9/2020 | Ogino .................. G02B 26/101 |
| 2020/0393545 A1 | 12/2020 | Shani et al. |

FOREIGN PATENT DOCUMENTS

| | | |
|---|---|---|
| KR | 10-2009-0128989 A | 12/2009 |
| KR | 10-2012-0062541 A | 6/2012 |
| KR | 10-2017-0135522 A | 12/2017 |
| KR | 20170135522 A * | 12/2017 |
| KR | 10-2019-0084086 A | 7/2019 |
| KR | 10-2020-0044212 A | 4/2020 |
| WO | 2017/033566 A1 | 3/2017 |
| WO | 2020/166286 A1 | 8/2020 |

OTHER PUBLICATIONS

International Search Report dated Jun. 9, 2022.
Extended European Search Report dated Jun. 12, 2024.

* cited by examiner

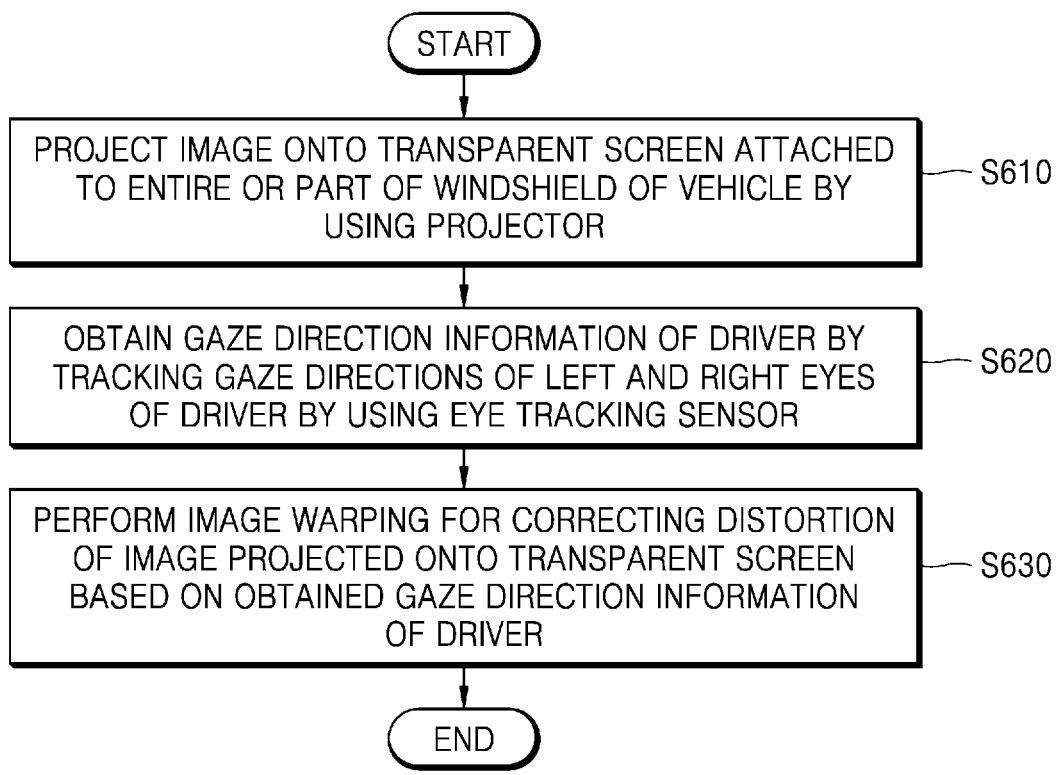

ELECTRONIC DEVICE FOR PROJECTING IMAGE ONTO WINDSHIELD OF VEHICLE AND OPERATING METHOD THEREOF

CROSS-REFERENCE TO RELATED APPLICATION(S)

This application is a Continuation of and claims priority under 35 U.S.C. § 120 to PCT International Application No. PCT/KR2022/002729, which was filed on Feb. 24, 2022, and claims priority to Korean Patent Application 10-2021-0027489, which was filed on Mar. 2, 2021 the disclosures of which are incorporated by reference herein their entirety.

BACKGROUND

Technical Field

The disclosure relates to an electronic device for use in a vehicle, and more particularly, to an electronic device capable of projecting an image onto a windshield of a vehicle.

Description of Related Art

In recent years, vehicular displays have seen advancements in technology, resulting in the inclusion of large-sized and/or high-resolution displays in vehicles, improved form factors in such in-vehicle displays, etc. Many of these advancements are driven in response to innovations and changes to vehicle interiors caused by the introduction of autonomous and semi-autonomous self-driving vehicles, electric vehicles, etc. For example, it is now possible for a driver to consume multimedia content while disposed in the driver's seat (e.g., due to the semi-autonomous driving function of the vehicle), which benefits from the inclusion of a large-sized, state-of-the-art display. However, due to the persisting requirements of vehicular interiors, there remains a physical limitation on the size of a display that can be installed into the vehicle. For example, an excessively large display may block a driver's view of the external environment, which is unsafe. Furthermore, there are issues with or a complete lack of consideration of user-experience (UX) and user-interface (UI) elements for vehicular displays.

SUMMARY

In order to increase a size of the vehicular display without obstructing a driver's view of the exterior environment, it is possible to utilize the glass windshield of the vehicle as a display surface. Windshields typically form a front-facing surface of the vehicle, and are formed of transparent glass. By displaying images on the windshield, a new UX (or UI) may be provided to driver and passengers. To actually do so, a projector may be utilized, such as a heads-up display (HUD).

However, when projecting images onto the windshield, some of the projected light may be transmitted to an exterior of the vehicle due to the transparency of the windshield. Furthermore, the projected light may be reflected along an irregular path, resulting in distortion of the image on the windshield. To prevent some of these issues, a lower power projection may be utilized. However, this results in diminished luminance of the projected image, and reduced visibility of the same to the driver.

The disclosure relates to an electronic device for projecting an image onto a transparent screen attached to a windshield of a vehicle, and an operating method thereof. An embodiment of the disclosure provides an electronic device for projecting an image onto a transparent screen by using a projector, that can correct distortions in the projected image while accounting for a gazing direction and field of view of the driver, and an operating method thereof.

An embodiment of the disclosure provides an electronic device for projecting an image onto a windshield of a vehicle, including a transparent screen, attached to at least a part of the windshield, and configured to refract light of a projection towards a driver of the vehicle, a projector configured to project an image onto the transparent screen, an eye tracking sensor configured to detect a gaze direction of the driver by tracking left and right eyes of the driver, a memory storing a program including one or more instructions for controlling the electronic device, and a processor configured to execute the one or more instructions to cause the electronic device to: alter the image projected onto the transparent screen based at least on the detected gaze direction, to correct distortion of the image as perceivable by the driver when the image is projected onto the transparent screen.

In an embodiment of the disclosure, the processor may obtain gaze vectors representing the gaze directions of the left and right eyes of the driver from the eye tracking sensor, and obtain information about magnitudes, angles, and heights of the obtained gaze vectors.

In an embodiment of the disclosure, the processor may calculate a degree of distortion of the image projected onto the transparent screen by using the information about the magnitudes, angles, and heights of the gaze vectors, and perform image warping for correcting the projected image based on the calculated degree of distortion of the image.

In an embodiment of the disclosure, the electronic device may further include a camera configured to obtain a driver image by photographing the driver, and the processor may obtain position information of the eyes of the driver by detecting the eyes of the driver from the driver image obtained from the camera, and perform the image warping based on the obtained position information of the eyes and the gaze direction information of the left and right eyes of the driver.

In an embodiment of the disclosure, the processor may obtain information about the gaze directions of the left and right eyes of the driver by using the eye tracking sensor, detect a gaze point at which the obtained gaze directions of the left eye and the right eye converge, calculate a vergence distance between both eyes of the driver and the gaze point, and control the projector to adjust, based on the vergence distance, a focal length of the image projected on the transparent screen.

In an embodiment of the disclosure, the transparent screen may include a plurality of inclination angle patterns changing a path of the light to cause the light of the image to be directed toward the driver by refracting light of the image projected by the projector.

In an embodiment of the disclosure, the transparent screen may be divided into a plurality of regions, and the plurality of inclination angle patterns may be formed to have different angles for the plurality of regions, respectively.

In an embodiment of the disclosure, the processor may control the projector to project different images onto the plurality of regions of the transparent screen, respectively.

An embodiment of the disclosure provides a method of projecting an image onto a windshield of a vehicle, including projecting, by using a projector, an image onto a transparent screen attached to part of or the entire windshield, obtaining gaze direction information of a driver by tracking gaze directions of left and right eyes of the driver, and performing image warping for correcting a distortion of the image projected onto the transparent screen based on the obtained gaze direction information of the driver.

In an embodiment of the disclosure, the obtaining of the gaze direction information of the driver may include obtaining gaze vectors representing the gaze directions of the left and right eyes of the driver by using an eye tracking sensor, and obtaining information about magnitudes, angles, and heights of the obtained gaze vectors.

In an embodiment of the disclosure, the performing of the image warping may include calculating a degree of distortion of the image projected onto the transparent screen by using the information about the magnitudes, angles, and heights of the gaze vectors, and performing image warping for correcting the projected image based on the calculated degree of distortion of the image.

In an embodiment of the disclosure, the method may further include obtaining a driver image by photographing the driver by using a camera included in a driver monitoring system, and obtaining position information of the eyes of the driver by detecting the eyes of the driver from the driver image, and, in the performing of the image warping, the image warping may be performed based on the obtained position information of the eyes and the gaze direction information of the left and right eyes of the driver.

In an embodiment of the disclosure, the obtaining of the gaze direction information of the driver may include obtaining information about the gaze directions of the left and right eyes of the driver by using the eye tracking sensor, and detecting a gaze point at which the obtained gaze directions of the left eye and the right eye converge, and the method may further include calculating a vergence distance between both eyes of the driver and the gaze point, and adjusting, based on the vergence distance, a focal length of the image projected on the transparent screen.

In an embodiment of the disclosure, the transparent screen may include a plurality of inclination angle patterns changing a path of the light to cause the light of the image to be directed toward the driver by refracting light of the image projected by the projector.

In an embodiment of the disclosure, the transparent screen may be divided into a plurality of regions, and the plurality of inclination angle patterns may be formed to have different angles for the plurality of regions, respectively.

In an embodiment of the disclosure, in the projecting of the image onto the transparent screen, different images may be projected onto the plurality of regions of the transparent screen, respectively.

An embodiment of the disclosure provides an electronic device for projecting an image onto a windshield of a vehicle, including projecting, via a projector, an image onto a transparent screen attached to at least a part of the windshield, detecting a gaze direction of a driver by tracking, via a processor, left and right eyes of a driver of the vehicle, and altering the image, via the processor, based at least one the detected gaze direction, to correct distortion of the image as perceivable by the driver when the image is projected onto the transparent screen.

In an embodiment of the disclosure, the plurality of inclination angle patterns included in at least one of the plurality of divided regions of the transparent screen may be formed to have an inclination angle that refracts the path of the light of the image projected from the projector to be directed toward the driver's seat.

In an embodiment of the disclosure, the transparent screen may further include a reflective layer which is formed on at least one inclined surface included in the plurality of inclination angle patterns, and reflects the light of the image toward the driver's seat.

In an embodiment of the disclosure, the transparent screen may further include a switchable film formed on the windshield and the transparent film, wherein transmittance of the switchable film with respect to external light is adjusted according to supplied power.

BRIEF DESCRIPTION OF DRAWINGS

FIG. 6 is a flowchart illustrating an operating method of an electronic device according to an embodiment of the disclosure.

DETAILED DESCRIPTION

Figure 1:
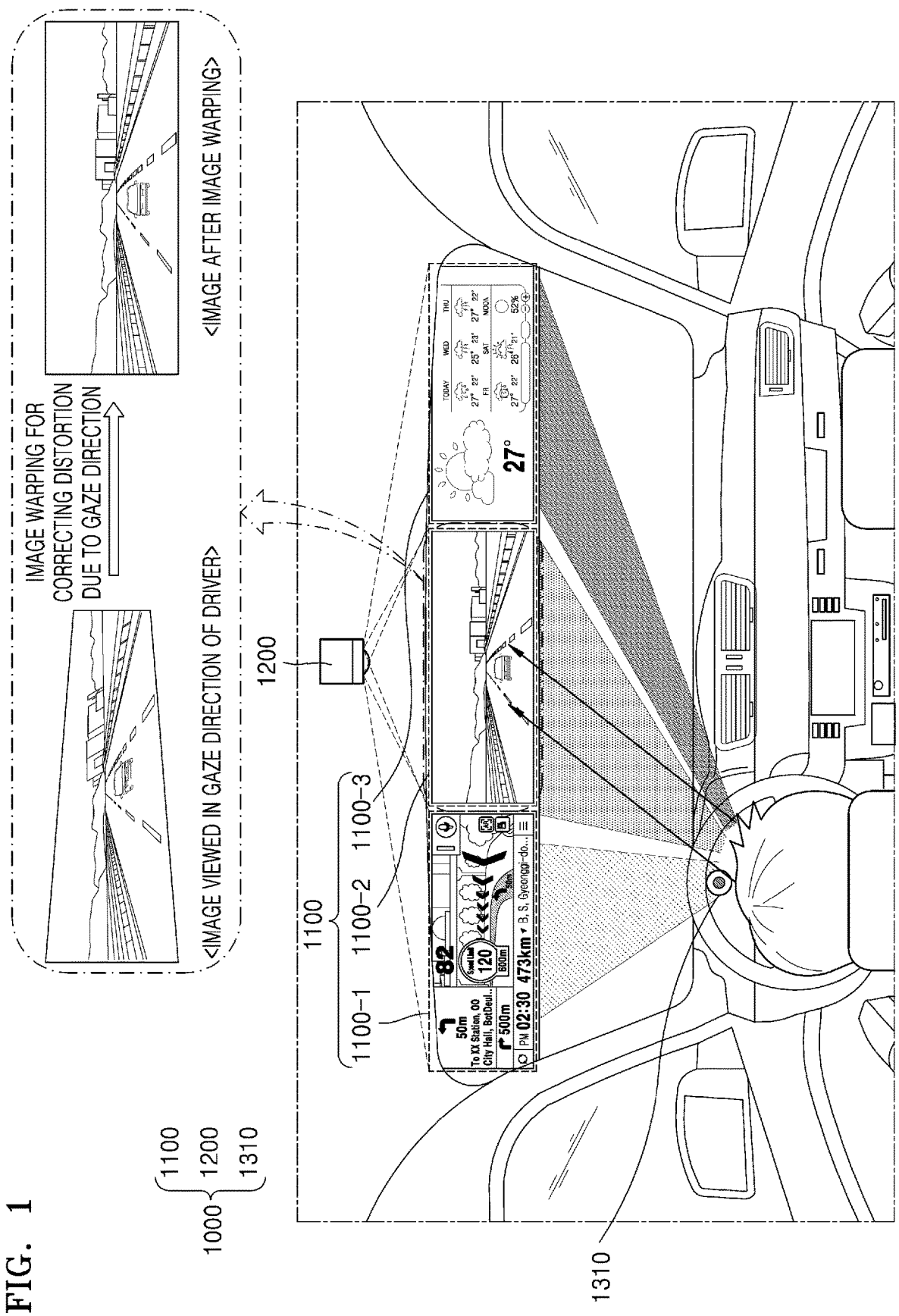
FIG. 1 is a conceptual diagram illustrating a method, performed by an electronic device of the disclosure, of projecting an image onto a transparent screen attached to a windshield of a vehicle.

Throughout the disclosure, the expression "at least one of a, b, or c" indicates only a, only b, only c, both a and b, both a and c, both b and c, all of a, b, and c, or variations thereof.

Although the terms used in the disclosure are selected from among common terms that are currently commonly used in consideration of their function in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used herein are not merely designations of the terms, but the terms are defined based on the meaning of the terms and content throughout the disclosure.

The singular expression also includes the plural meaning as long as it does not inconsistent with the context. All terms, including technical and scientific terms, used herein have the same meaning as commonly understood by one of skill in the art to which the disclosure pertains based on an understanding of the disclosure.

Throughout the disclosure, when a part "includes" an element, it is to be understood that the part may additionally include other elements rather than excluding other elements as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

The expression "configured to", as used herein, may be interchangeably used with, for example, "suitable for", "having the capacity to", "designed to", "adapted to", "made to", or "capable of" according to a situation. The term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory device.

In general, windshields refer to windows in the front, rear, left or right side of a vehicle. In the disclosure, a windshield refers to a windshield in the front of a vehicle. The windshield may be made of a transparent glass material. The windshield may be referred to as a 'windscreen'. In an embodiment of the disclosure, the windshield may be implemented with single-layer glass or double-laminated glass. However, the disclosure is not limited thereto.

In the disclosure, 'image warping' refers to an image processing technique for changing positions of pixels including an image. Image warping is a type of geometric transformation, and may change positions of pixels in an original image. Image warping may be performed by a transformation function for changing a position of a pixel.

FIG. 1 is a conceptual diagram illustrating a method, performed by an electronic device 1000 of the disclosure, of projecting an image onto a transparent screen 1100 attached to a windshield 110 inside a vehicle.

Referring to FIG. 1, the electronic device 1000 may include the transparent screen 1100, a projector 1200, and an eye tracking sensor 1310. However, components included in the electronic device 1000 are not limited to those illustrated in FIG. 1. The components of the electronic device 1000 will be described in detail with reference to FIG. 5.

The transparent screen 1100 may be attached to the windshield 110, which may be a front window of the vehicle. The transparent screen 1100 may be a screen that at least partially reflects light incident from a light source (not shown) or incident from the outside, and may be formed of a transparent material. The transparent screen 1100 may be formed in the shape of a film or a plate. An image projected by the projector 1200 may be displayed on the transparent screen 1100.

The transparent screen 1100 may include a plurality of inclination angle patterns that direct the path of projected light towards a driver's seat, by reflecting and refracting light of the image projected by the projector 1200. Because of the plurality of inclination angle patterns, the light of the image projected by the projector 1200 may be reflected and refracted in a direction toward a driver seated in the driver's seat.

The transparent screen 1100 may be divided into a plurality of regions 1100-1, 1100-2, and 1100-3 (hereinafter, also referred to as the first region 1100-1, the second region 1100-2, and the third region 1100-3). Images representing different pieces of information or external environments may be projected onto the plurality of regions 1100-1, 1100-2, and 1100-3 of the transparent screen 1100, respectively. For example, an augmented reality image representing a route guidance signal or navigation information related to operation of the vehicle may be projected onto the first region 1100-1 of the transparent screen 1100, a rear-view mirror image captured by a rear camera of the vehicle may be projected onto the second region 1100-2, and a user interface (UI) image representing other related information, such as present weather conditions, may be projected onto the third region 1100-3.

The plurality of inclination angle patterns formed in the transparent screen 1100 may include different angles for each of the plurality of regions 1100-1, 1100-2, and 1100-3. The structure of the plurality of inclination angle patterns included in the transparent screen 1100 will be described in detail with reference to FIGS. 3B and 4.

The projector 1200 may be configured to project an image onto the transparent screen 1100. The projector 1200 may be configured to generate light for display of an image. The projector 1200 may include an image panel, illumination optics, projection optics, and the like. In an embodiment of the disclosure, the projector 1200 may obtain, from a processor 1400 (see FIG. 5), image data including an image including a variety of information, generate a virtual image based on the obtained image data, and project light forming the virtual image output from a light source, onto the transparent screen 1100 through a light exit surface.

The eye tracking sensor 1310 may be configured to track the gaze direction of the eyes of the driver. The eye tracking sensor 1310 may detect gaze direction information of the driver by tracking the individual gaze directions of the left and right eyes of the driver. In an embodiment of the disclosure, the eye tracking sensor 1310 may detect the gaze direction of the driver by via images of the pupils of the driver, or detecting a direction and/or amount of illumination light, such as near-infrared light, reflected from the driver's corneas.

The processor 1400 (see FIG. 5) included in the electronic device 1000 may obtain gaze direction information of the left and right eyes of the driver from the eye tracking sensor 1310, and alter the image (e.g., warping the image) to correct distortion of the image when projected onto the transparent screen 1100 based on the obtained gaze direction information. In the embodiment illustrated in FIG. 1, when viewed from the perspective of the driver, an image projected by the projector 1200 onto the second region 1100-2 of the transparent screen 1100 may not appear as originally formatted, but may appear distorted from the perspective of the user. The degree of distortion of the image, for example, when viewed by the driver, may depend on at least one of the distance between both eyes of the driver and the transparent screen 1100, the angle of the gaze direction of the driver gazing at the second region 1100-2 of the transparent screen 1100, or the height of the eyes of the driver. In an embodiment of the disclosure, the processor 1400 may obtain, from the gaze direction information obtained by the eye tracking sensor 1310, information about at least one of the distance between both eyes of the driver and the transparent screen 1100, the angle of the gaze direction of the driver gazing at the transparent screen 1100, or the gaze height of the driver, and perform image warping for preventing an image distortion based on the obtained information. Here, 'image warping' refers to an image processing technique for altering the visual structure of the image (e.g., changing positions of display pixels forming the image). In an embodiment of the disclosure, the processor 1400 may perform image warping by using a transformation function that includes a vertical or horizontal shift, enlargement, reduction, tilting, rotation, or the like, based on the detected gaze direction of the driver.

In the related art, for displaying an image onto the windshield 110, a method of projecting an image by using a projector such as a head-up display (HUD) was used. However, when projecting an image onto the windshield 110 of the vehicle by using a projector, a projected image is transmitted to the outside due to a transparent glass material, or light of the projected image is reflected along an irregular path, and thus the image is not properly formed on the windshield. In addition, because the gaze direction of the driver is not considered in the related art, there is a technical limitation in that the image viewed by the driver is distorted according to the region of the windshield 110 onto which the image is projected.

The electronic device 1000 according to the embodiment illustrated in FIG. 1 projects an image onto the transparent screen 1100 attached to the windshield 110 by using the projector 1200, the transparent screen 1100 has a structure including the plurality of inclination angle patterns that change the path of light forming the image to be directed toward the driver, and accordingly, a high-luminance, high-resolution image may be provided and the visibility of the driver may be improved. The transparent screen 1100 of the disclosure is attached to the entire or part of the windshield 110 and is divided into the plurality of regions 1100-1, 1100-2, and 1100-3, and images providing different pieces of information are projected onto the plurality of regions 1100-1, 1100-2, and 1100-3, respectively, and thus the transparent screen 1100 may replace a physical rear-view mirror in an existing vehicle, thereby improving the aesthetics of a vehicle interior design and expanding the view of a driver. Furthermore, the electronic device 1000 according to an embodiment of the disclosure obtain the gaze direction information of the driver through the eye tracking sensor 1310, and performs image warping for correcting a distortion of the image projected onto the transparent screen 1100 based on the gaze direction information, and thus convenience and satisfaction of the driver may be improved.

Figure 2A:
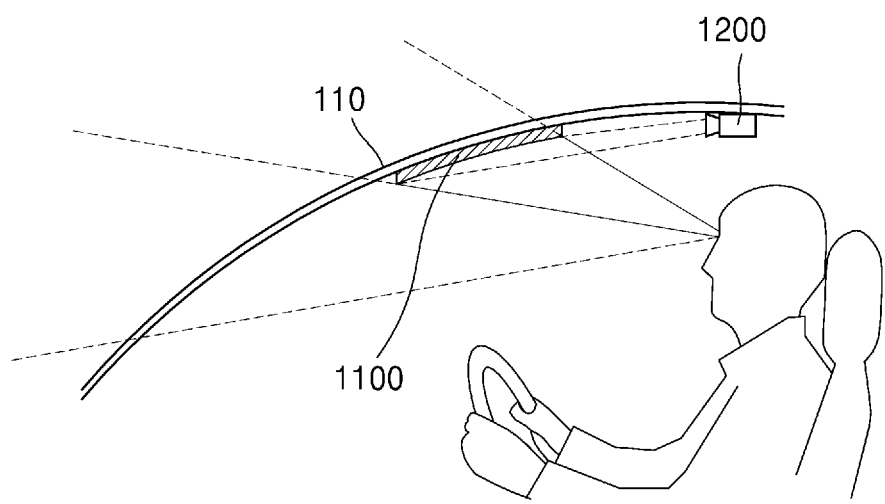
FIG. 2A is a cross-sectional view illustrating an arrangement relationship between a windshield and a transparent screen of the disclosure.

FIG. 2A is a cross-sectional view illustrating an arrangement relationship between the windshield 110 and the transparent screen 1100 of the disclosure.

Referring to FIG. 2A, the transparent screen 1100 may be formed on an inner surface of the windshield 110, which faces an interior of the vehicle. The transparent screen 1100 may be attached either a portion of the windshield 110 or an entirety thereof. The transparent screen 1100 may be attached to the windshield 110 through a curable resin or synthetic resin.

Although FIG. 2A illustrates the projector 1200 arranged on the inner surface of the windshield 110, the disclosure is not limited thereto. In an embodiment of the disclosure, the projector 1200 may be arranged on the headliner of the vehicle or below the roof of the vehicle, or may be arranged on a console box in the vehicle.

Figure 2B:
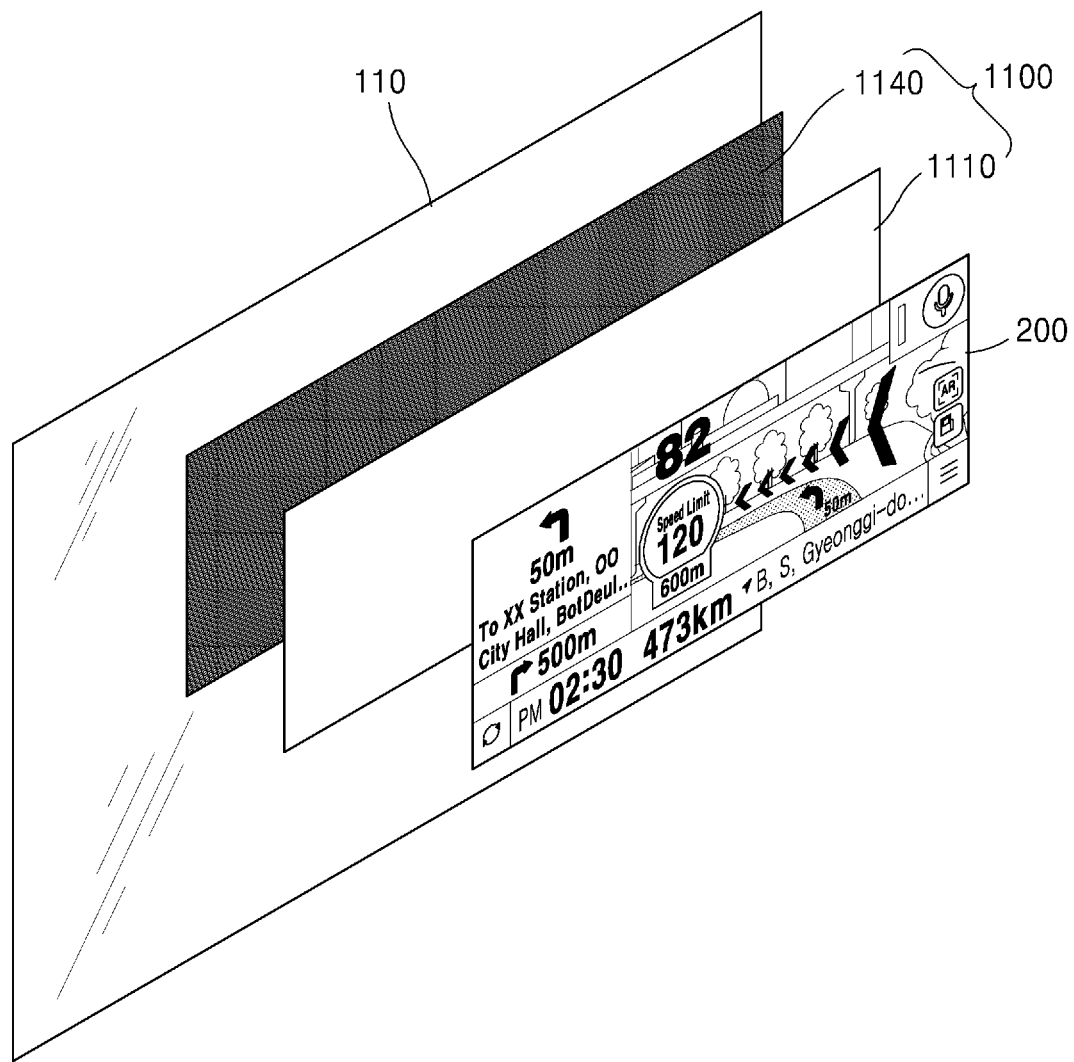
FIG. 2B is a perspective view illustrating a structure of a transparent screen according to an embodiment of the disclosure.

FIG. 2B is a perspective view illustrating a structure of the transparent screen 1100 according to an embodiment of the disclosure.

Referring to FIG. 2B, the transparent screen 1100 may include a transparent substrate layer 1110 and a switchable film 1140. The transparent substrate layer 1110 may interact with light forming an image 200 as projected by the projector 1200 (see FIG. 2A), or light incident from the exterior of the vehicle, and may be formed of a transparent material. The transparent substrate layer 1110 may be formed (e.g., shaped) as a film or a plate. In an embodiment of the disclosure, the transparent substrate layer 1110 may be formed of a polymer film.

The plurality of inclination angle patterns may be formed on the transparent substrate layer 1110. The structure of the plurality of inclination angle patterns will be described in detail with reference to FIG. 3B.

The switchable film 1140 may be disposed between the transparent substrate layer 1110 and the windshield 110. The switchable film 1140 may be implemented as a film, for which the transmittance of external light is selectively adjustable according to power supplied from a power source. For example, the switchable film 1140 may include an electrochromic window (EC) capable of selectively changing transparency according to power supply. However, the disclosure is not limited thereto, and the switchable film 1140 may be formed of a polymer-dispersed liquid crystal (PDLC) layer having transparency that is selectively adjustable by changing the alignment direction of liquid crystal molecules disposed therein, according to supplied power.

Figure 3A:
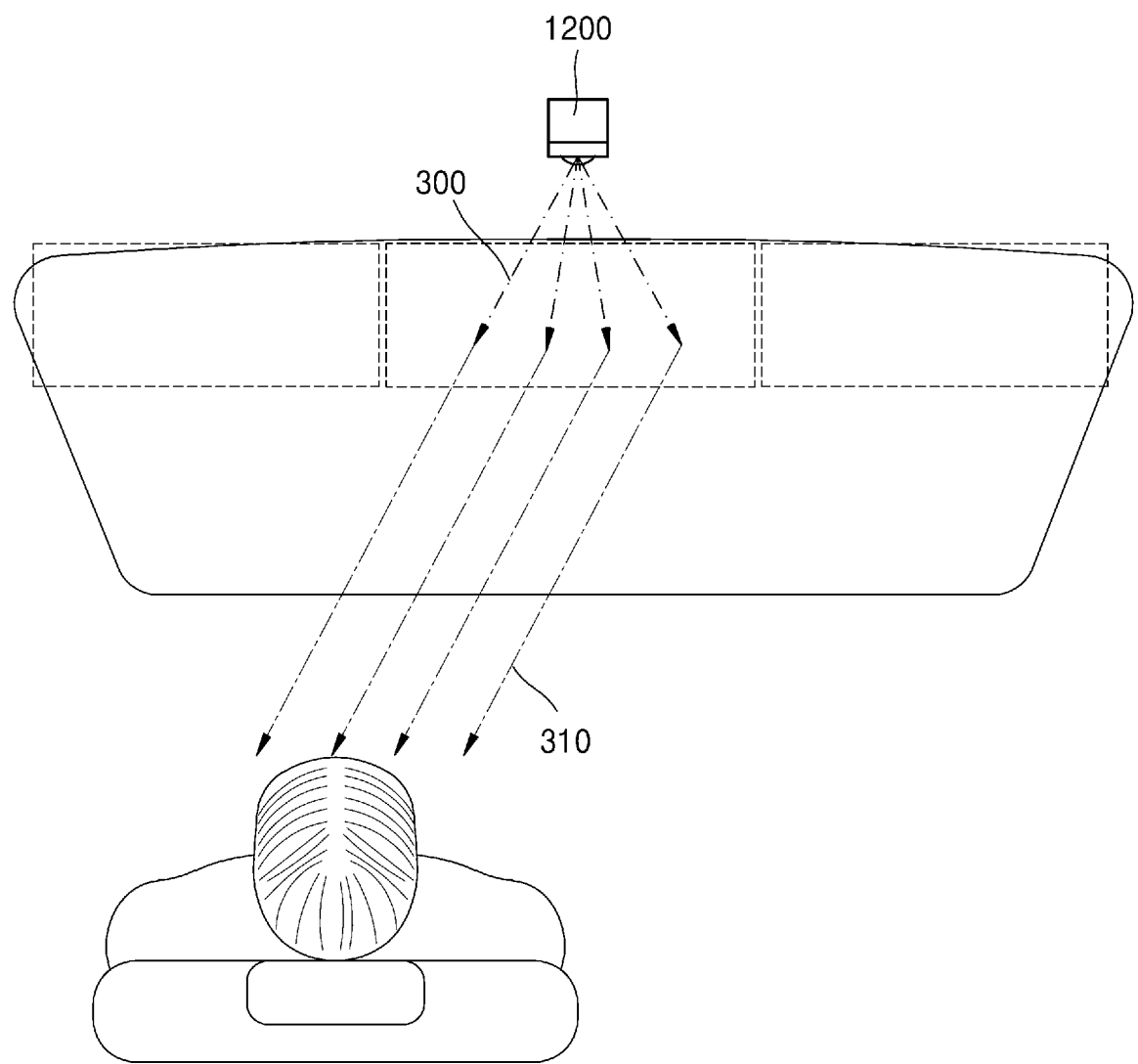
FIG. 3A is a conceptual diagram illustrating a method, performed by a transparent screen, of changing the path of light of an image projected by a projector, according to an embodiment of the disclosure.

FIG. 3A is a conceptual diagram illustrating a method, performed by the transparent screen 1100, of changing the path of light of an image projected by the projector 1200, according to an embodiment of the disclosure.

Referring to FIG. 3A, the transparent screen 1100 may change the path of light of an image projected by the projector 1200 to be directed toward the driver. In an embodiment of the disclosure, the transparent screen 1100 may include a plurality of inclination angle patterns 1120 (see FIG. 3B) that change the path of light by reflecting or refracting the light of the image.

In the embodiment illustrated in FIG. 3A, incident light 300 that is projected by the projector 1200 and contacts to the transparent screen 1100 may be reflected and/or refracted by the plurality of inclination angle patterns 1120 formed on the transparent screen 1100, forming the exiting light 310 that is directed toward the driver. To this end, the plurality of inclination angle patterns 1120 may include respective arrangement directions and inclination angles accounting for the position of the projector 1200 and the position of the driver's seat. The structure of the plurality of inclination angle patterns 1120 will be described in detail with reference to FIG. 3B.

Figure 3B:
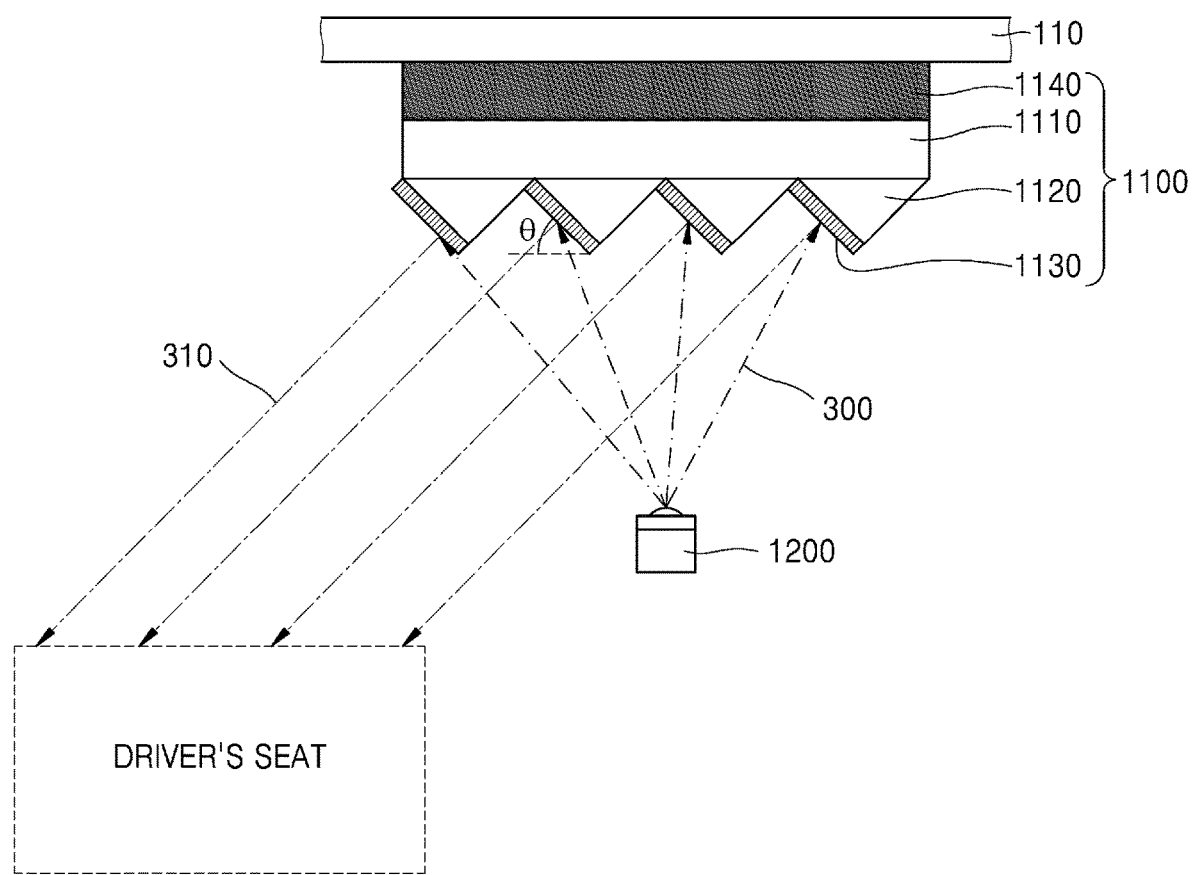
FIG. 3B is a cross-sectional view of a transparent screen according to an embodiment of the disclosure.

FIG. 3B is a cross-sectional view of the transparent screen 1100 according to an embodiment of the disclosure.

Referring to FIG. 3B, the transparent screen 1100 may include the transparent substrate layer 1110, a plurality of inclination angle patterns 1120, a reflective layer 1130, and the switchable film 1140. In an embodiment of the disclosure, the transparent screen 1100 may omit one or more of the above components. For example, the transparent screen 1100 may not include the switchable film 1140, and include the transparent substrate layer 1110, the plurality of inclination angle patterns 1120, and the reflective layer 1130.

The transparent substrate layer 1110 is implemented using a film or plate formed of a transparent material. The transparent substrate layer 1110 may transmit light incident from the outside, and may display an image projected by the projector 1200. In an embodiment of the disclosure, the transparent substrate layer 1110 may be formed of a polymer film. For example, the transparent substrate layer 1110 may be formed of at least one of polycarbonate (PC), polyethylene (PE), polypropylene (PP), or polyethylene terephthalate (PET).

The plurality of inclination angle patterns 1120 are formed on the transparent substrate layer 1110. The plurality of inclination angle patterns 1120 may change the path of the projected light 300 from the projector 1200 so as to be directed toward the driver's seat. The plurality of inclination angle patterns 1120 may be formed to protrude by a preset height from one surface of the transparent substrate layer 1110, and may include at least one inclined surface for changing the path of the light 300. In an embodiment of the disclosure, the plurality of inclination angle patterns 1120 may be continuously arranged on the transparent substrate layer 1110, and each of them may be implemented as a prism pattern protruding in the shape of an inverted triangle, in a direction oriented towards the interior of the vehicle. The plurality of inclination angle patterns 1120 may thus change the light 310 of the image projected from the projector 1200, into the exiting light 310 that is directed toward the driver's seat, by using diffractiveness or refractiveness of the light 300. The plurality of inclination angle patterns 1120 may be formed to have a preset inclination angle θ with respect to a first direction (an X-axis direction). The inclination angle θ may be determined and designed based on the direction of the driver's seat or the height of the eyes of the driver, and the gaze direction of the driver.

The plurality of inclination angle patterns 1120 may be formed using, for example, an engraving, embossing, laser ablation, or lithography method, and then using the tool to perform structurization through a cast-and-cure or extruding duplication technique. However, the method described above is an example of forming the plurality of inclination angle patterns 1120, and the disclosure is not limited thereto. The plurality of inclination angle patterns 1120 may be formed of the same material as that of the transparent substrate layer 1110, but the disclosure is not limited thereto. The plurality of inclination angle patterns 1120 may be formed of at least one of an acrylic resin, for example, polymethyl methacrylate (PMMA), polystyrene, polycarbonate, polyester, or silicone.

The plurality of inclination angle patterns 1120 may improve light concentration properties by changing the directivity of the light 300, in that light which is prone to scattering is transformed into the exiting light 310 directed toward the predetermined angle corresponding to the driver's seat.

The reflective layer 1130 is formed on surfaces of at least part of the plurality of inclination angle patterns 1120, and is configured to reflect the light 300 of the image projected by the projector 1200 to be directed toward the driver's seat. In some embodiments, the reflective layer 1130 may be operated as a full mirror that reflects a totality of the incident light 300. The reflective layer 1130 may be formed of at least one of aluminum (Al), silver (Ag), or a combination thereof. In an embodiment of the disclosure, the reflective layer 1130 may be formed as a single dielectric layer or a plurality of dielectric layers having a refractive index capable of realizing a full mirror.

The switchable film 1140 may be formed between the transparent substrate layer 1110 and the windshield 110. The switchable film 1140 is implemented as a film, in which the transmittance with respect to external light is selectively adjustable according to power supplied from a power source. The description with reference to FIG. 2B is applicable to the switchable film 1140, and thus a duplicate description will be omitted. When no image is projected by the projector 1200, the switchable film 1140 may be used as a sunshade by stopping or blocking power supply.

Figure 4:
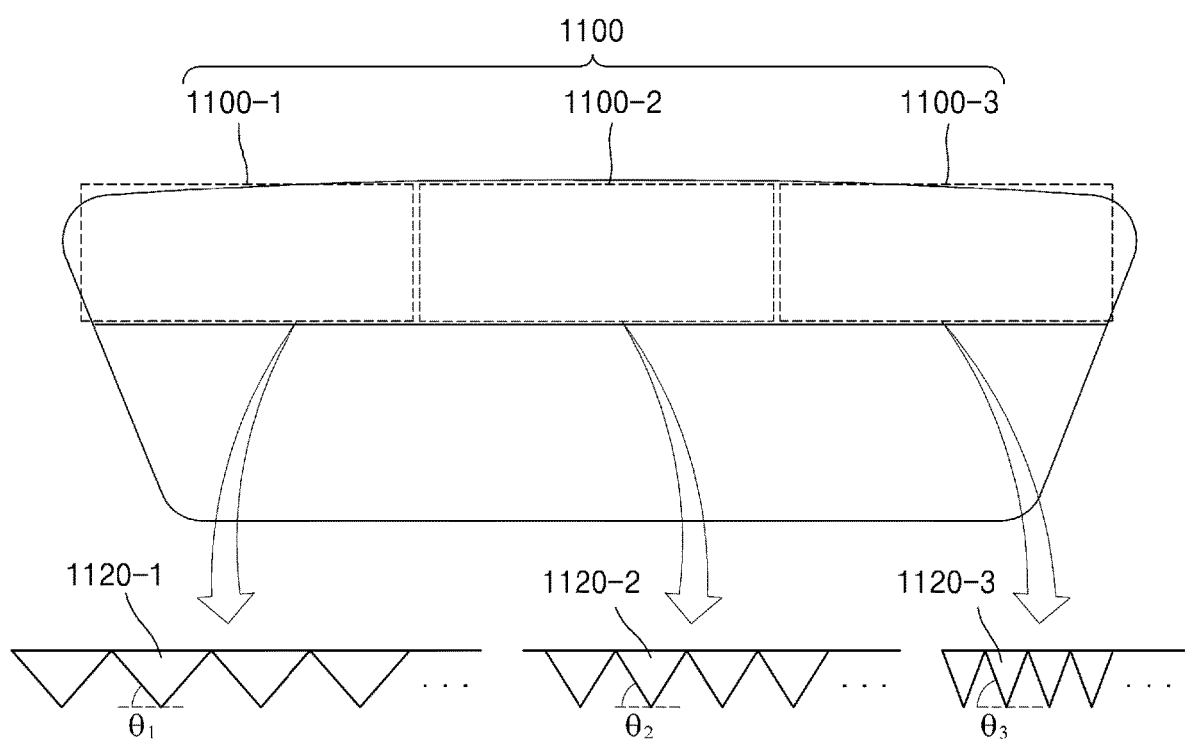
FIG. 4 is a cross-sectional view illustrating a plurality of inclination angle patterns included in a transparent screen, according to an embodiment of the disclosure.

FIG. 4 is a cross-sectional view illustrating a plurality of inclination angle patterns 1120-1, 1120-2, and 1120-3 (hereinafter, also referred to as the plurality of first inclination angle patterns 1120-1, the plurality of second inclination angle patterns 1120-2, and the plurality of third inclination angle patterns 1120-3) included in the transparent screen 1100, according to an embodiment of the disclosure.

Referring to FIG. 4, the transparent screen 1100 may be divided into the plurality of regions 1100-1, 1100-2, and 1100-3, and the plurality of inclination angle patterns 1120-1, 1120-2, and 1120-3 respectively included in the plurality of regions 1100-1, 1100-2, and 1100-3 may be formed to have different angles of inclined surfaces. Although FIG. 4 illustrates a transparent screen 1100 that is divided into three regions, this is merely an example intended for simplicity of description, and the number of regions into which the transparent screen 1100 is divided is not limited to three.

In an embodiment of the disclosure, the plurality of inclination angle patterns 1120-1, 1120-2, and 1120-3 may be formed to have inclined surfaces with different angles such that incident light is refracted or reflected to be directed toward the driver's seat. In the embodiment illustrated in FIG. 4, the plurality of first inclination angle patterns 1120-1 included in the first region 1100-1 of the transparent screen 1100 may be formed to have inclined surfaces with a first angle $θ_1$ with respect to a plane, the plurality of second inclination angle patterns 1120-2 included in the second region 1100-2 of the transparent screen 1100 may be formed to have inclined surfaces with a second angle $θ_2$ with respect to the plane, and the plurality of third inclination angle patterns 1120-3 included in the third region 1100-3 of the transparent screen 1100 may be formed to have inclined surfaces with a third angle $θ_3$ with respect to the plane.

According to an embodiment of the disclosure, the transparent screen 1100 may include the plurality of inclination angle patterns 1120-1, 1120-2, and 1120-3 having inclined surfaces with different angles for each of the plurality of regions 1100-1, 1100-2, and 1100-3, and thus an image projected by the projector 1200 (see FIG. 3B) may be visible when viewed from the driver's seat and barely visible, or invisible when viewed from the front passenger's seat. However, the disclosure is not limited thereto, and the plurality of inclination angle patterns included in at least one of the plurality of regions 1100-1, 1100-2, and 1100-3 may be formed to have angles of inclined surfaces to change the path of light of an image incident from the projector 1200 to be directed toward the driver's seat.

Figure 5:
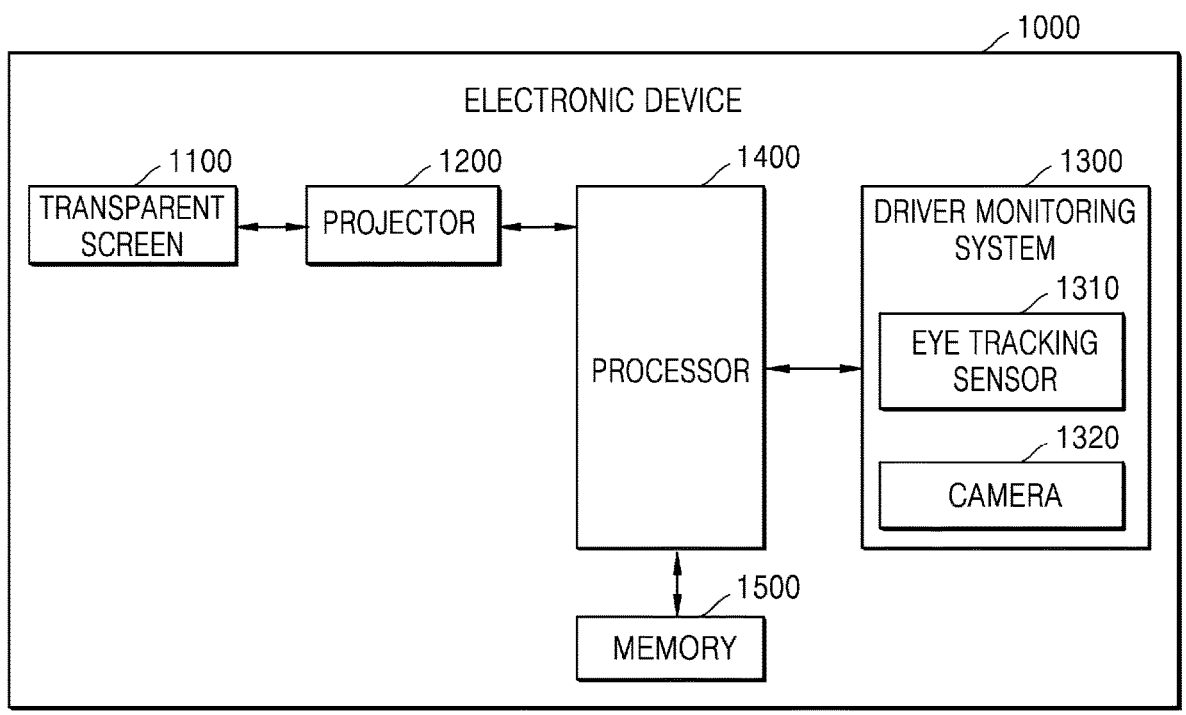
FIG. 5 is a block diagram illustrating a configuration of an electronic device according to an embodiment of the disclosure.

FIG. 5 is a block diagram illustrating a configuration of the electronic device 1000 according to an embodiment of the disclosure.

Referring to FIG. 5, the electronic device 1000 may include the transparent screen 1100, the projector 1200, a driver monitoring system 1300, the processor 1400, and a memory 1500. The projector 1200, the driver monitoring system 1300, the processor 1400, and the memory 1500 may be electrically and/or physically connected to each other. The components illustrated in FIG. 5 are merely illustrative examples of an embodiment of the disclosure, and the components included in the electronic device 1000 are not limited to those illustrated in FIG. 5. The electronic device 1000 may not include some of the components illustrated in FIG. 5, and may further include components not illustrated in FIG. 5.

The transparent screen 1100 may be arranged on an entirety or a portion less than entirety of the windshield of the vehicle, and may be formed in the shape of a film or plate made of a transparent material. An image projected by the projector 1200 may be displayed on the transparent screen 1100. The transparent screen 1100 may include a plurality of inclination angle patterns that changes the path of light of the image to be directed toward the driver by reflecting or refracting light of the image projected by the projector 1200.

In an embodiment of the disclosure, the transparent screen 1100 may be divided into a plurality of regions, and the plurality of inclination angle patterns may be formed to have inclined surfaces with different angles for the plurality of regions, respectively. The descriptions with reference to FIGS. 2A to 4 are applicable to the transparent screen 1100, and thus a duplicate description will be omitted.

The projector 1200 may be configured to project an image onto the transparent screen 1100. The projector 1200 may be configured to generate light of an image, and including an image panel, illumination optics, projection optics, and the like.

The projector 1200 may include a light source that outputs light, an image panel that forms an image by using the light output from the light source, and projection optics that projects light of the image formed by the image panel. The light source may include an optical element that illuminates light and may generate the light by adjusting colors thereof (e.g., of RGB). The light source may be configured as, for example, a light emitting diode (LED). The image panel be reflective, as to modulate and reflect the light illuminated by the light source, into light including a two-dimensional image. The reflective image panel may be, for example, a digital micromirror device (DMD) panel, a liquid crystal on silicon (LCoS) panel, or any other suitable reflective image panel.

In an embodiment of the disclosure, the projector 1200 may include a light source that outputs light and a dual-axis scanner that two-dimensionally scans the light output from the light source. In another embodiment of the disclosure, the projector 1200 may include a light source that outputs light, a linear image panel that forms a linear image (i.e., a one-dimensional image) by using the light output from the light source, and a single-axis scanner that scans light of the linear image formed by the linear image panel.

The projector 1200 may obtain, from the processor 1400, image data including an image including various pieces of information, generate a virtual image based on the obtained image data, and project light forming the virtual image, which is output from the light source, onto the transparent screen 1100 through the light exit surface. In an embodiment of the disclosure, the processor 1400 may provide the projector 1200 with image data including RGB color and luminance values of a plurality of pixels including an image, and the projector 1200 may project the light forming the image onto the transparent screen 1100 by controlling the light source according to the RGB color and luminance values of each of the plurality of pixels. In an embodiment of the disclosure, the projector 1200 may project the light of the image by using a transmissive projection technology in which the light source is modulated by an optically active material illuminated as a white light.

The driver monitoring system 1300 may include the eye tracking sensor 1310 and a camera 1320.

The eye tracking sensor 1310 may be capable of tracking the gaze direction of the eyes of the driver. The eye tracking sensor 1310 may obtain gaze direction information of the driver by tracking the gaze directions of the left and right eyes of the driver. In an embodiment of the disclosure, the eye tracking sensor 1310 may detect the gaze direction of the driver by detecting an image of a pupil of the driver, or detecting the direction or amount of illumination light, such as near-infrared light, reflected from the cornea. The eye tracking sensor 1310 includes a left eye tracking sensor and a right eye tracking sensor, which are capable of detecting a gaze direction of the left eye of the driver and a gaze direction of the right eye of the driver, respectively. Detection of a gaze direction of the driver may include an operation of obtaining gaze information related to the gaze of the driver.

In an embodiment of the disclosure, the eye tracking sensor 1310 may include one or a plurality of infrared irradiators, a plurality of infrared detectors (e.g., infrared (IR) sensors), and an eye tracking camera. However, the disclosure is not limited thereto, and the eye tracking sensor 1310 may include an infrared irradiator and an infrared detector, or may include an infrared irradiator and an eye tracking camera. The eye tracking sensor 1310 may use the infrared detector (e.g., an IR sensor) to track the position of the pupil of the driver and sense a gaze direction.

A detailed structure and operation of the eye tracking sensor 1310 will be described in detail with reference to FIGS. 7A and 7B.

The camera 1320 may be configured to obtain a driver image by photographing the driver of the vehicle. In an embodiment of the disclosure, the camera 1320 may capture the face of the driver, obtain an image of the face of the driver, and provide the obtained image to the processor 1400.

The camera 1320 may include an image sensor, such as a complementary metal-oxide semiconductor (CMOS), a charge-coupled device (CCD), or an active pixel sensor, and a lens, such as at least one of a linear lens, a concave lens, a convex lens, or a wide-angle lens. The camera 1320 may include an analog-type camera or a digital-type camera. In an embodiment of the disclosure, the camera 1320 may include an infrared illumination output device.

In an embodiment of the disclosure, the camera 1320 may be arranged in a certain area of the vehicle, for example, on a dashboard, a rear-view mirror, or an instrument cluster of the vehicle. However, the position of the camera 1320 is not limited to the above-described example.

The processor 1400 may execute one or more instructions of a program stored in the memory 1500. The processor 1400 may include hardware components that perform arithmetic, logic and input/output operations and signal processing. For example, the processor 1400 may include, but is not limited to, at least one of a central processing unit, a microprocessor, a graphics processing unit, application specific integrated circuits (ASICs), digital signal processors (DSPs), digital signal processing devices (DSPDs), programmable logic devices (PLDs), or field programmable gate arrays (FPGAs).

The memory 1500 may include, for example, a non-volatile memory including at least one of a flash memory-type memory, a hard disk-type memory, a multimedia card micro-type memory, a card-type memory (e.g., a secure digital (SD) or extreme digital (XD) memory), a read-only memory (ROM), an electrically erasable programmable ROM (EEPROM), or a programmable ROM (PROM), and a volatile memory such as a random-access memory (RAM) or a static RAM (SRAM).

The memory 1500 may store instructions, data structures, and program code, which may be read by the processor 1400. According to an embodiment of the disclosure, the processor 1400 may execute instructions or code of a program stored in the memory. For example, the memory 1500 may store instructions or code of a program related to operations and/or functions of controlling the projector 1200 to project an image onto the transparent screen 1100, tracking the gaze directions of the left and right eyes of the driver by using the eye tracking sensor 1310 to obtain gaze direction information of the driver, and performing image warping for correcting a distortion of the image projected onto the transparent screen 1100.

The processor 1400 may obtain, from the eye tracking sensor 1310, gaze direction information of the left and right eyes of the driver, and perform image warping for correcting a distortion of an image projected by the projector 1200 onto the transparent screen 1100, based on the obtained gaze direction information of the driver. In the disclosure, 'image warping' refers to an image processing technique for changing positions of pixels including an image. Image warping may be performed by a transformation function for changing a position of a pixel. In an embodiment of the disclosure, the processor 1400 may obtain, from the eye tracking sensor 1310, a first gaze vector representing a gaze direction of the left eye of the driver, and a second gaze vector representing a gaze direction of the right eye of the driver, and obtain information about the magnitude, angle, and height of each of the obtained first and second gaze vectors. The processor 1400 may calculate the degree of distortion of the image projected onto the transparent screen 1100 by using the information about the magnitudes, angles, and heights of the first and second gaze vectors, and perform image warping for correcting the image based on the calculated degree of distortion of the image. The processor 1400 may perform image warping based on the information about the magnitudes, angles, and heights of the first and second gaze vectors, thereby providing an undistorted image considering all of the height of the eyes, the field of view, and the gaze direction of the driver according to the driver's physique. A detailed embodiment in which the processor 1400 performs image warping based on information about the gaze vectors will be described in detail with reference to FIGS. 8A, 8B, and 9.

In an embodiment of the disclosure, the processor 1400 may obtain the driver image captured by the camera 1320 and detect the positions of the eyes of the driver from the driver image by using a known image processing algorithm or an artificial intelligence (AI) model including deep learning. In an embodiment of the disclosure, the processor 1400 may detect a feature point of a face from the driver image through training using a convolutional neural network (CNN) model including pre-trained model parameters. The processor 1400 may detect the eyes, nose, mouth, hairstyle, etc. of the face of the driver from the driver image through, for example, CASIA-WebFace, VGGFace/VGGFace 2, or MS-Celeb-1M. The processor 1400 may obtain position information of the detected eyes of the driver, and perform image warping based on the obtained position information of the eyes and the gaze direction information of the left and right eyes of the driver obtained from the eye tracking sensor 1310. A detailed embodiment in which the processor 1400 performs image warping based on the position information of the eyes and the gaze direction information will be described in detail with reference to FIG. 10.

In an embodiment of the disclosure, the processor 1400 may detect a gaze point at which the gaze direction of the left eye of the driver and the gaze direction of the right eye of the driver obtained from the eye tracking sensor 1310 converge, calculate a vergence distance between both eyes of the driver and the gaze point, and control the projector 1200 to adjust the focal length of the image projected onto the transparent screen 1100 based on the vergence distance. A detailed embodiment in which the processor 1400 adjusts the focal length of the image projected by the projector 1200 based on the vergence distance will be described in detail with reference to FIGS. 11 and 12.

FIG. 6 is a flowchart illustrating an operating method of the electronic device 1000 according to an embodiment of the disclosure.

In operation S610, the electronic device 1000 may project an image onto the transparent screen attached to the either an entirety or a portion less than an entirety of the windshield of the vehicle by using the projector. In an embodiment of the disclosure, the transparent screen may include a plurality of regions divided therefrom. In an embodiment of the disclosure, the electronic device 1000 may project images representing different pieces of information or external environments onto the plurality of regions of the transparent screen, respectively. For example, the electronic device 1000 may control the projector to project an augmented reality image representing a route guidance signal or navigation information related to driving of the vehicle onto a first region of the transparent screen, a rear-view mirror image captured by a rear camera of the vehicle onto a second region of the transparent screen, and a UI representing information such as weather onto a third region of the transparent screen.

In operation S620, the electronic device 1000 may obtain gaze direction information of the driver by tracking individual gaze directions of the left and right eyes of the driver using the eye tracking sensor. In an embodiment of the disclosure, the electronic device 1000 may obtain a first gaze vector representing a gaze direction of the left eye of the driver, and a second gaze vector representing a gaze direction of the right eye of the driver by using the eye tracking sensor. The electronic device 1000 may obtain information about the magnitude, angle, and height of each of the obtained first and second gaze vectors.

In operation S630, the electronic device 1000 may perform alteration of the image (e.g., image warping) to correct distortion of the image projected onto the transparent screen as viewed by the driver, based on the obtained gaze direction information of the driver. In an embodiment of the disclosure, the electronic device 1000 may calculate the degree of a distortion of the image displayed on the transparent screen when viewed by the driver, by using the information about the magnitudes, angles, and heights of the first gaze vector and the second gaze vector obtained in operation S620. The electronic device 1000 may perform image warping for correcting the projected image based on the calculated degree of distortion of the image. The electronic device 1000 may control the projector to project an image on which image warping is completely performed.

Figure 7A:
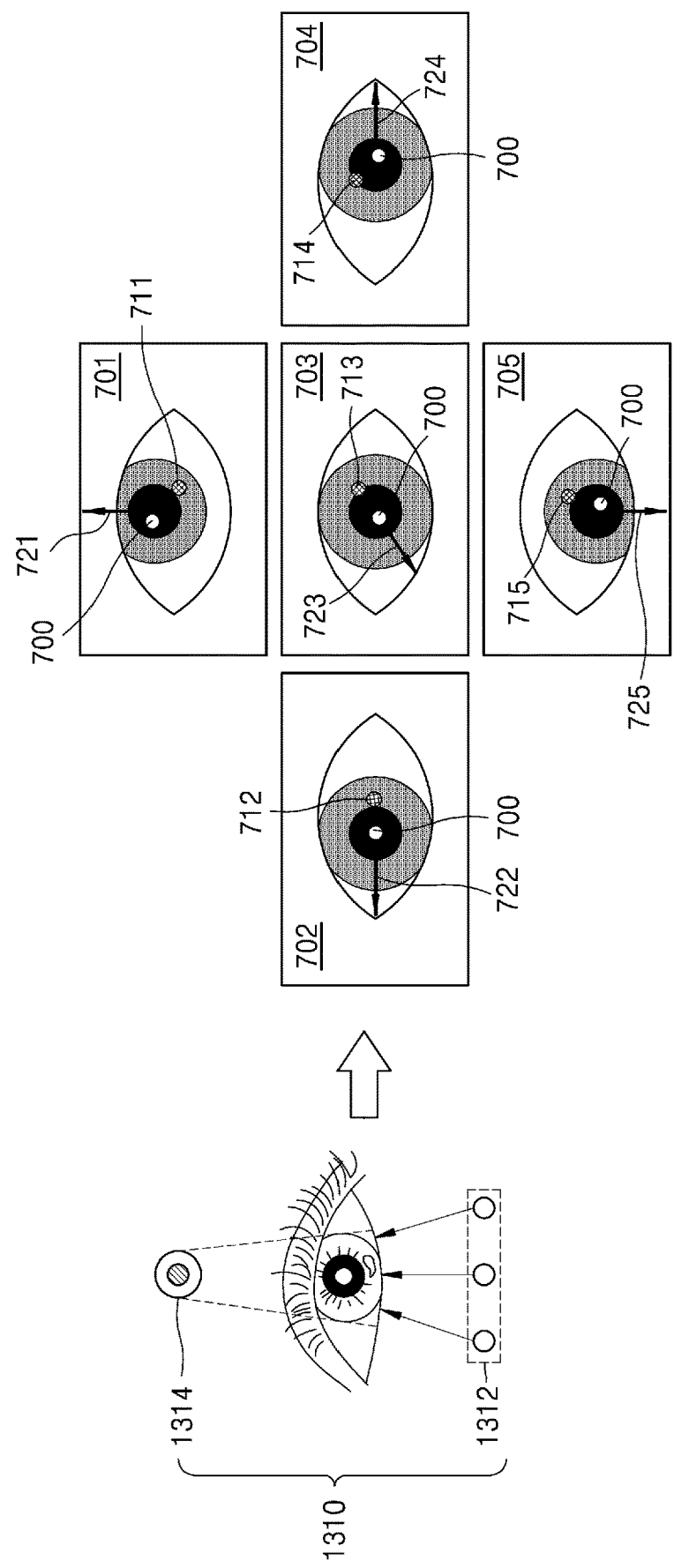
FIG. 7A is a diagram illustrating a method, performed by an eye tracking sensor included in an electronic device of the disclosure, of obtaining gaze direction information of a driver.

FIG. 7A is a diagram illustrating a method, performed by the eye tracking sensor 1310 included in the electronic device 1000 of the disclosure, of obtaining gaze direction information of the driver.

Referring to FIG. 7A, the eye tracking sensor 1310 may track the gaze of the driver based on the positions of rays of reflected light 711, 712, 713, 714, and 715 reflected from an eye of the driver, and thus obtain a gaze vector. The eye tracking sensor 1310 may include light sources 1312 (hereinafter, also referred to as the infrared light sources 1312) and a camera 1314.

The light sources 1312 may include an infrared light-emitting diode (IR LED). In the embodiment illustrated in FIG. 7A, the light sources 1312 may include a plurality of light-emitting diodes arranged at different positions. When capturing an image of the eye of the driver, the light sources 1312 may provide light (e.g., infrared light) to the eye of the driver. As the light is provided to the eye of the driver, rays of reflected light from the eye of the driver may be generated.

The camera 1314 may include at least one camera. The camera 1314 may include an infrared camera. The electronic device 1000 may track the gaze of the eye of the driver by using driver eye images 701 to 705 (hereinafter, also referred to as the plurality of eye images 701 to 705 and the first to fifth eye images 701 to 705) captured by the camera 1314. For example, the eye tracking sensor 1310 may detect a pupil 700 and the rays of reflected light 711, 712, 713, 714, and 715 from the driver eye images 701 to 705, to track the gaze of the driver and thus obtain a gaze vector. The eye tracking sensor 1310 may detect the positions of the pupil 700 and the rays of reflected light 711 to 715 from the driver eye images 701 to 705, and determine the gaze direction of the eye based on the relationship between the position of the pupil 700 and the positions of the rays of reflected light 711 to 715.

For example, the eye tracking sensor 1310 may detect, from the captured first eye image 701, the pupil 700 and the ray of reflected light 711, and determine a gaze direction 721 of the eye of the driver based on the relationship between the position of the pupil 700 and the position of the ray of reflected light 711. In the same manner, the eye tracking sensor 1310 may detect, from the second to fifth eye images 702, 703, 704, and 705, the pupil 700 and the rays of reflected light 712, 713, 714, and 715, and determine gaze directions 722, 723, 724, and 725 of the eye of the driver based on the relationships between the positions of the pupil 700 and the positions of the rays of reflected light 712, 713, 714, and 715, respectively.

In an embodiment of the disclosure, the eye tracking sensor 1310 may obtain a gaze vector based on information about the determined gaze direction. The eye tracking sensor 1310 may provide the processor 1400 (see FIG. 5) with data regarding the magnitude and direction of the obtained gaze vector.

In another embodiment of the disclosure, the eye tracking sensor 1310 may provide the processor 1400 with coordinate values related to the positions of the pupil 700 and the rays of reflected light 711 to 715 detected from the plurality of eye images 701 to 705, and the processor 1400 may calculate the gaze vectors of the eye of the driver based on the coordinate values obtained from the eye tracking sensor 1310.

Although FIG. 7A illustrates the eye tracking sensor 1310 including the infrared light sources 1312 and the camera 1314, the eye tracking sensor 1310 of the disclosure is not limited to the structure and operation method illustrated in FIG. 7A. In an embodiment of the disclosure, the eye tracking sensor 1310 may have a structure including an infrared irradiator and an infrared ray detector. The infrared irradiator may be configured to irradiate infrared light to a portion of a cornea where the lens of an eye is arranged, and the infrared detector may be configured to detect infrared light reflected from the cornea. In an embodiment of the disclosure, a plurality of infrared detectors may be provided, and the eye tracking sensor 1310 may obtain information about the amount of infrared light detected by each of the plurality of infrared detectors, determine a gaze direction of the eye of the driver based on the obtained amount of infrared light, and obtain a gaze vector representing the gaze direction.

Figure 7B:
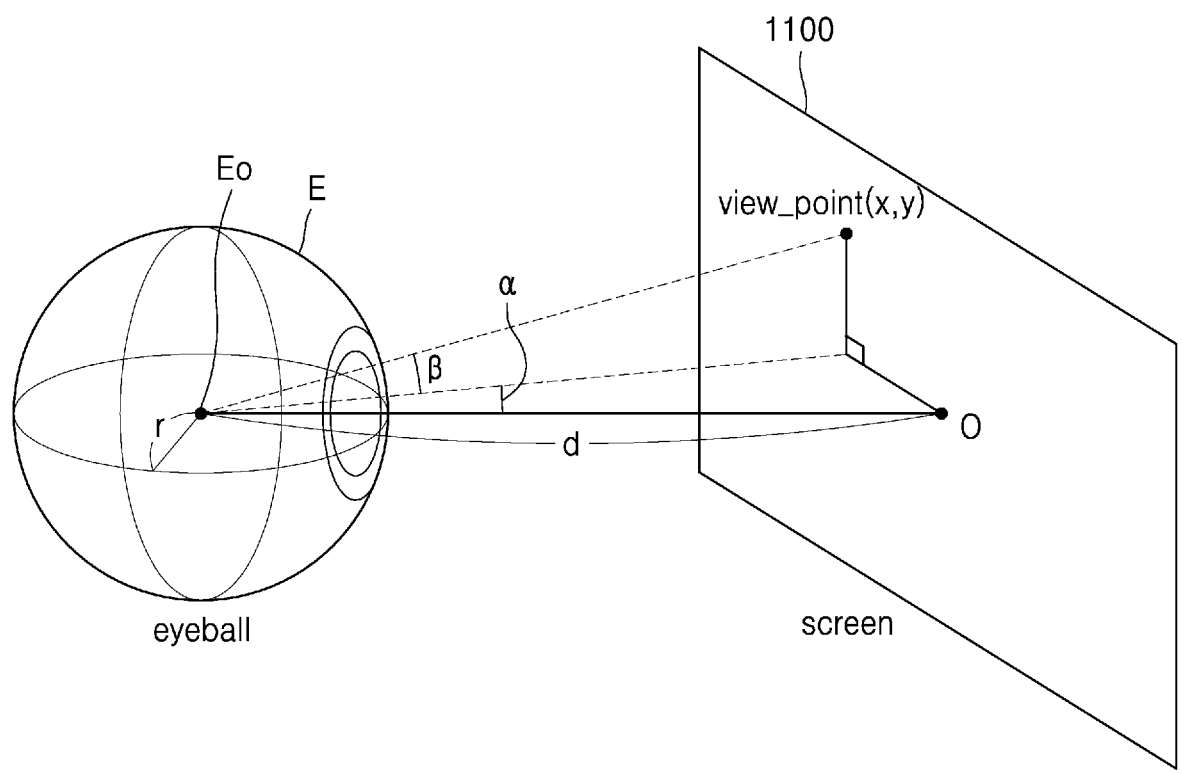
FIG. 7B is a diagram illustrating an eyeball model of a gaze direction measured by an eye tracking sensor of the disclosure.

FIG. 7B is a diagram illustrating an eyeball model of a gaze direction measured by the eye tracking sensor 1310 of the disclosure.

Referring to FIG. 7B, tracking of a gaze direction according to an embodiment of the disclosure may be performed based on a three-dimensional eyeball model of a gaze. Assuming that an eyeball has a perfect spherical shape and the eyeball ideally spatially rotates according to a gaze, the three-dimensional eyeball model of a gaze may mathematically model a gaze, as in Equations 1 and 2 below.

$$x = d \cdot \tan\alpha \quad \text{[Equation 1]}$$
$$y = d \cdot \sec\alpha \cdot \tan\beta$$

$$\beta = \sin^{-1}\frac{\Delta y}{r} \quad \text{[Equation 2]}$$
$$\alpha = \sin^{-1}\frac{\Delta x}{r \cos\beta}$$

In Equation 1, d denotes a distance between a center $E_o$ of an eyeball of the driver and the transparent screen 1100, α denotes an angle of rotation of the eyeball of the driver in the x-axis (the horizontal axis) direction when the eye of the driver is gazing at the front of the transparent screen 1100, and β denotes an angle of rotation of the eyeball of the driver in the y-axis (the vertical axis) direction when the eye of the driver is gazing at the front of the transparent screen 1100. In addition, in Equation 2, "r" denotes the radius of the sphere, assuming that the eyeball of the driver is a sphere.

The eye tracking sensor 1310 (see FIG. 7A) according to an embodiment of the disclosure may measure the degree of rotation (e.g., α and β) of an eyeball E of the driver, and the electronic device 1000 may calculate two-dimensional position coordinate values (x, y) of a gaze direction of the eyeball E of the driver on the transparent screen 1100 by using the degree of rotation (α and β) of the eyeball E of the driver. The degree of rotation (α and β) of the eyeball E may be understood as information about gaze angles of the eyeball E in the horizontal and vertical directions.

An actual real-world movement of the eyeball is not an ideal three-dimensional rotation, and in particular, for leftward/rightward gazes, relaxation or contraction of eyeball muscles may be sufficiently large as to cause an error during vertical gaze estimation for the leftward/rightward gazes based on an ideal three-dimensional rotation eyeball model. In order to compensate for such an error, the electronic device 1000 may perform calibration, such as by instructing the driver to look at a random or preset point, then compare a gaze direction value estimated by the eye tracker 1310 with an actual gaze direction value for the point, and statistically process the comparison result, thereby improving accuracy of future detections.

Figure 8A:
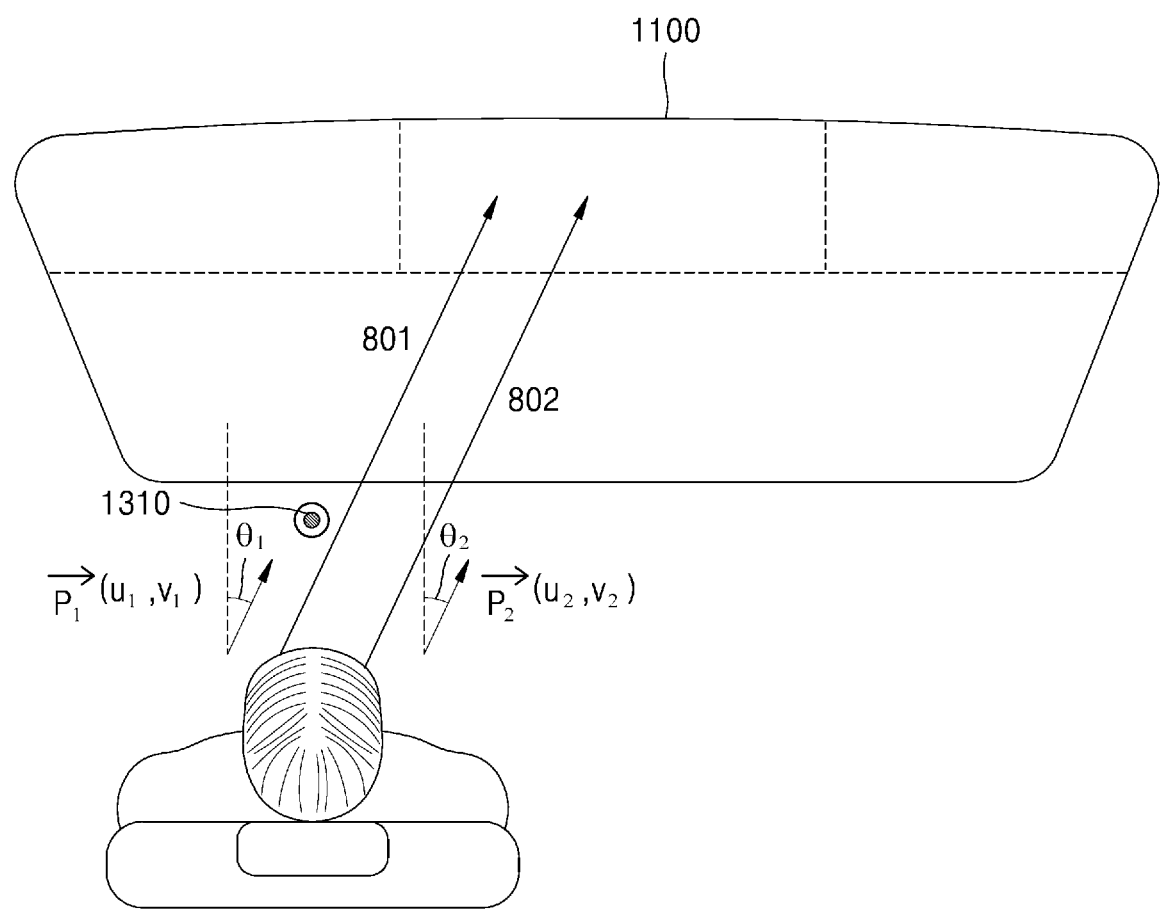
FIG. 8A is a diagram illustrating a method, performed by an electronic device, of obtaining information about a gaze vector representing a gaze direction of a driver, according to an embodiment of the disclosure.

FIG. 8A is a diagram illustrating a method, performed by the electronic device 1000, of obtaining information about a gaze vector representing a gaze direction of the driver, according to an embodiment of the disclosure.

Referring to FIG. 8A, by tracking a gaze direction 801 of the left eye of the driver and a gaze direction 802 of the right eye of the driver using the eye tracking sensor 1310, information about a first gaze vector $\vec{P_1}$ representing the gaze direction 801 of the left eye and a second gaze vector $\vec{P_2}$ representing the gaze direction 802 of the right eye may be obtained. The eye tracking sensor 1310 may provide the processor 1400 (see FIG. 5) with the obtained information about the first gaze vector $\vec{P_1}$ and the second gaze vector $\vec{P_2}$.

The processor 1400 of the electronic device 1000 may obtain information about the magnitude, angle, and height of each of the obtained first gaze vector $\vec{P_1}$ and second gaze vector $\vec{P_2}$. In an embodiment of the disclosure, the processor 1400 may obtain information about $|\vec{P_1}|$, which is the magnitude of the first gaze vector $\vec{P_1}$, a first angle $\theta_1$, and a height, and information about $|\vec{P_2}|$, which is the magnitude of the second gaze vector $|\vec{P_2}|$, a second angle $\theta_2$, and a height. The processor 1400 may obtain information about the distance between both eyes of the driver and the transparent screen 1100, from magnitude information of the first gaze vector $\vec{P_1}$ representing the gaze direction 801 of the left eye and the second gaze vector $\vec{P_2}$ representing the gaze direction 802 of the right eye. In addition, the processor 1400 may obtain information about a direction in which the driver is looking at the transparent screen 1100, from information about the angles $\theta_1$ and $\theta_2$ of the first gaze vector $\vec{P_1}$ and the second gaze vector $\vec{P_2}$. In addition, the processor 1400 may obtain information about an eye height according to the driver's physique, from information about the heights of the first gaze vector $\vec{P_1}$ and the second gaze vector $\vec{P_2}$.

Figure 8B:
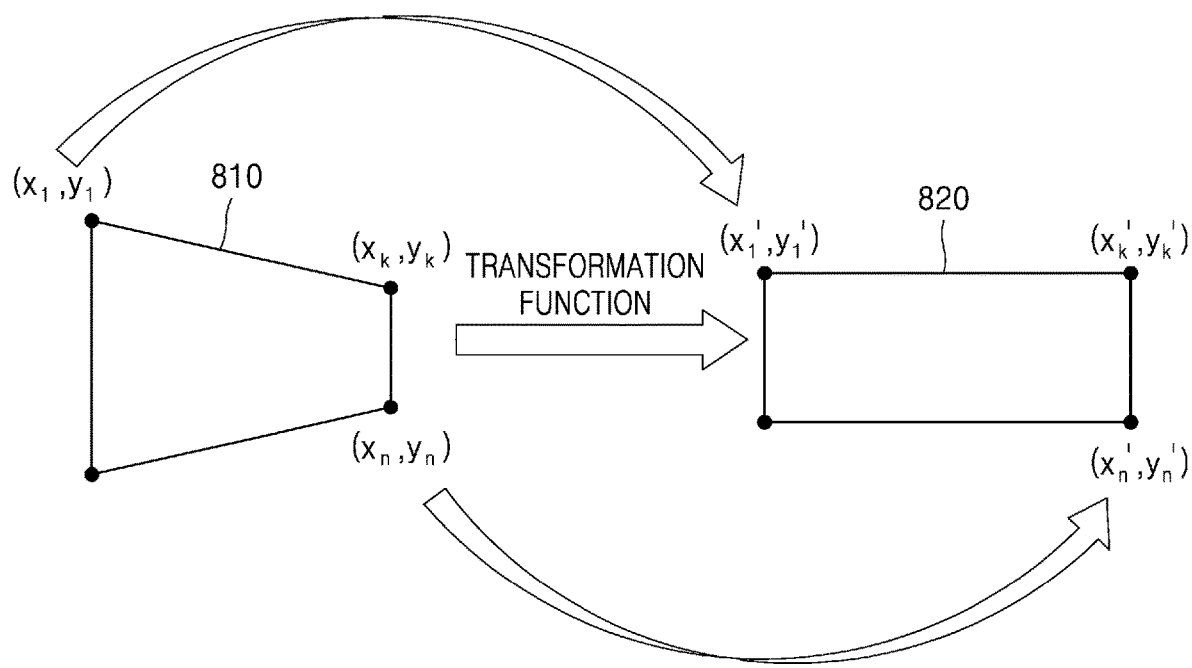
FIG. 8B is a diagram illustrating a method, performed by an electronic device, of performing image warping for correcting a distortion of an image, according to an embodiment of the disclosure.

FIG. 8B is a diagram illustrating a method, performed by the electronic device 1000, of performing image warping for correcting a distortion of an image, according to an embodiment of the disclosure.

Referring to FIG. 8B, the processor 1400 (see FIG. 5) of the electronic device 1000 may calculate a degree of distortion of an image 810 projected onto the transparent screen 1100 (see FIG. 8A), using the information on the detected magnitudes, angles, and heights of the first gaze vector $\vec{P_1}$ (see FIG. 8A) and the second gaze vector $\vec{P_2}$ (seer FIG. 8A). The processor 1400 may obtain information about respective position coordinates $(x_1, y_1), \ldots, (x_k, y_k), \ldots, (x_n, y_n)$ of a plurality of pixels included in the image 810 that the driver is presently looking at, using the information about the magnitudes, angles, and heights of the first gaze vector $\vec{P_1}$ (see FIG. 8A) and the second gaze vector $\vec{P_2}$ (seer FIG. 8A). The processor 1400 (see FIG. 5) of the electronic device 1000 may calculate the degree of distortion of the image 810 based on the information about the respective position coordinates $(x_1, y_1), \ldots, (x_k, y_k), \ldots, (x_n, y_n)$ of the plurality of pixels of the image 810. In an embodiment of the disclosure, the processor 1400 may obtain coordinate information of a plurality of pixels included in an original image projected onto the transparent screen 1100 by the projector, and calculate the degree of distortion of the image 810 based on positional relationships between the coordinate information of the plurality of pixels included in the original image and the respective position coordinates $(x_1, y_1), \ldots, (x_k, y_k), \ldots, (x_n, y_n)$ of the plurality of pixels of the image 810 viewed in the gaze direction of the driver.

The processor 1400 may perform alteration of the image (e.g., image warping) for correcting the detected distortion, according to the calculated degree of distortion of the image. 'Image warping' refers to an image processing technique for changing positions of pixels including an image. Image warping is a type of geometric transformation, and may change positions of pixels in an original image. Image warping may be performed by a transformation function for changing a position of a pixel. The transformation function is a preset function for shifting in up, down, left, and right directions, enlarging/reducing, tilting, or rotating pixels including an image. The transformation function is configured to have a matrix structure containing transformation parameters for each of shifting, enlarging/reducing, tilting or rotating.

In the embodiment illustrated in FIG. 8B, by applying, to a transformation function, the respective position coordinates $(x_1, y_1), \ldots, (x_k, y_k), \ldots, (x_n, y_n)$ of the plurality of pixels included in the image 810, the processor 1400 may shift the positions of the plurality of pixels to $(x_1', y_1'), \ldots, (x_k', y_k'), \ldots, (x_n', y_n')$. The resultant image 820 generated from executing image warping may eliminate distortions from the driver's perspective, and appear, to the driver, the same as the original image projected by the projector.

Figure 9:
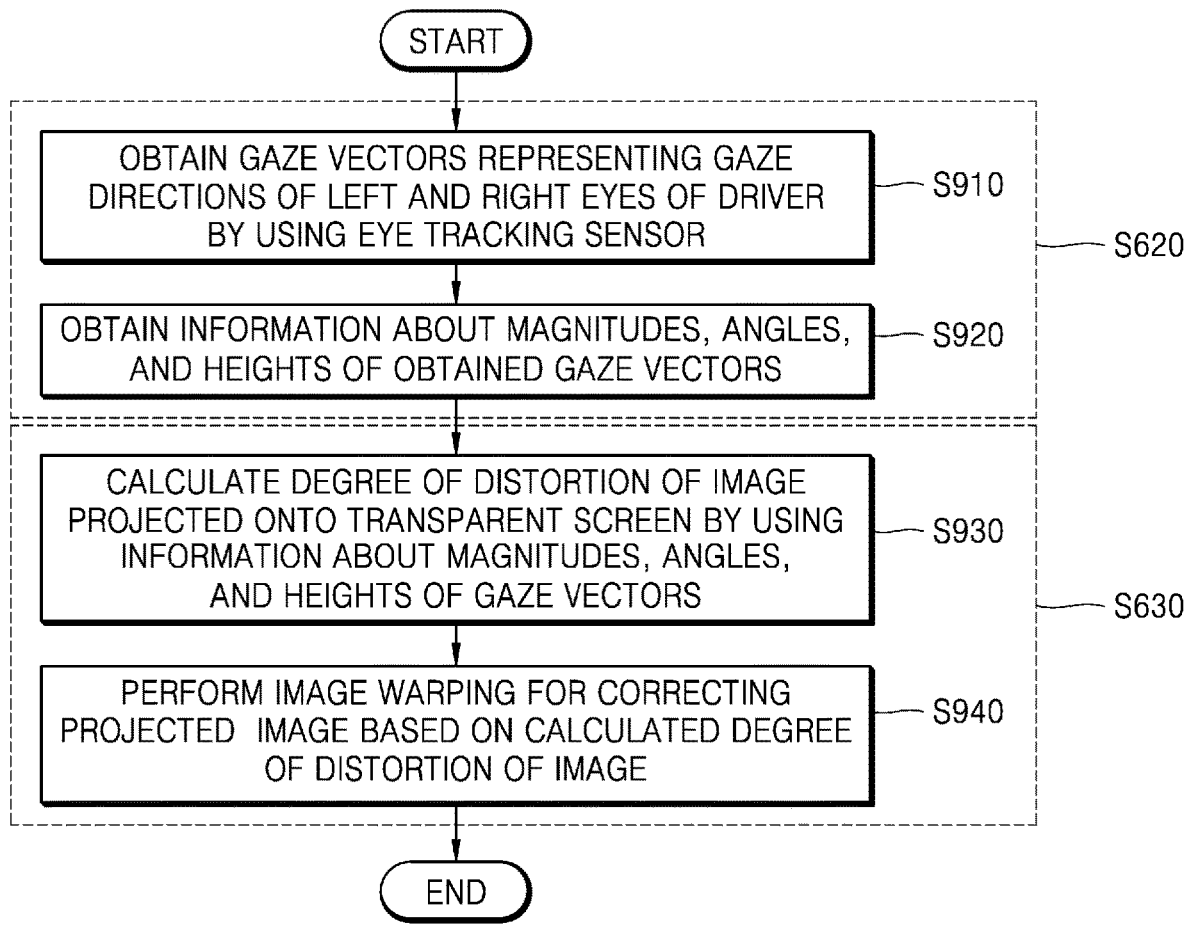
FIG. 9 is a flowchart illustrating a method, performed by an electronic device, of performing image warping based on information about a gaze vector, according to an embodiment of the disclosure.

FIG. 9 is a flowchart illustrating a method, performed by the electronic device 1000, of performing image warping based on information about a gaze vector, according to an embodiment of the disclosure.

Operations S910 and S920 shown in FIG. 9 are subdivided operations of operation S620 shown in FIG. 6. Operations S930 and S940 shown in FIG. 9 are subdivided operations of operation S630 shown in FIG. 6. Operation S910 shown in FIG. 9 is performed after operation S610 of FIG. 6 is performed.

In operation S910, the electronic device 1000 may obtain gaze vectors representing gaze directions of the left and right eyes of the driver, using the eye tracking sensor. In an embodiment of the disclosure, the electronic device 1000 may obtain, from the eye tracking sensor, information about a first gaze vector representing a gaze direction of the left eye of the driver and a second gaze vector representing a gaze direction of the right eye of the driver.

In operation S920, the electronic device 1000 may obtain information about the magnitudes, angles, and heights of the obtained gaze vectors.

In operation S930, the electronic device 1000 may calculate a degree of distortion of an image projected onto the transparent screen, as perceived by a driver, using the information about the magnitudes, angles, and heights of the gaze vectors. In an embodiment of the disclosure, the electronic device 1000 may obtain position coordinates of each of a plurality of pixels included in the image projected onto the transparent screen at which the driver is looking, using the information about the magnitudes, angles, and heights of the first and second gaze vectors. The electronic device 1000 may calculate the degree of distortion of the image that will be perceived by the driver, according to the gaze direction of the driver, by comparing the obtained position coordinates of the plurality of pixels with the position coordinates of the plurality of pixels included in the original image.

In operation S940, the electronic device 1000 may perform image warping for correcting the projected image based on the calculated degree of distortion of the image. In an embodiment of the disclosure, the electronic device 1000 may perform image warping shifting the positions of the plurality of pixels included in the image by using a transformation function determined in consideration of the calculated degree of distortion of the image. The detailed description of the method of performing image warping is the same as that given with reference to FIG. 8B, and thus a repetitive description will be omitted.

Figure 10:
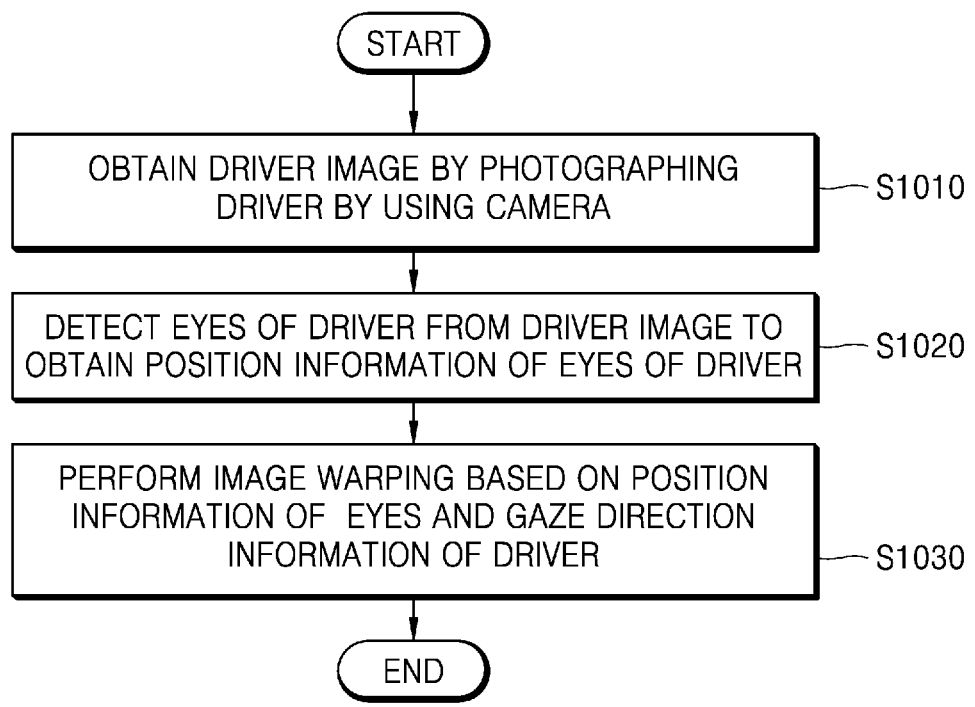
FIG. 10 is a flowchart illustrating a method, performed by an electronic device, of performing image warping, according to an embodiment of the disclosure.

FIG. 10 is a flowchart illustrating a method, performed by the electronic device 1000, of performing image warping, according to an embodiment of the disclosure.

In operation S1010, the electronic device 1000 may obtain a driver image by photographing the driver using a camera. In an embodiment of the disclosure, the electronic device 1000 may obtain the driver image, which may capture at least an upper body of the driver, including their face and eyes, using the camera 1320 (see FIG. 5) included in the driver monitoring system 1300 (see FIG. 5).

In operation S1020, the electronic device 1000 may detect the eyes of the driver from the driver image to obtain position information of the eyes of the driver. In an embodiment of the disclosure, the electronic device 1000 may detect the eyes of the driver from the driver image using an object detection model based on a known image processing technique, or via deep learning. For example, the electronic device 1000 may detect the eyes of the driver from the driver image using a CNN including a pre-trained model parameter. However, the object detecting model used by the electronic device 1000 to detect the eyes of the driver from the driver image is not limited to the above-described method or algorithm. In an embodiment of the disclosure, the object detection model may be an AI model including at least one of a recurrent neural network model (RNN), a support vector machine (SVM), linear regression, logistic regression, a random forest, a decision tree, or a k-nearest neighbor algorithm.

In operation S1030, the electronic device 1000 may perform image warping to correct any distortions of the image as perceived by the driver, based on the position information of the eyes of the driver and gaze direction information of the driver. In an embodiment of the disclosure, the electronic device 1000 may obtain the gaze direction information of the driver by using the eye tracking sensor. The electronic device 1000 may obtain information about the heights of the eyes from the gaze direction information of the driver and the position information of the eyes of the driver obtained in operation S1020, and perform image warping for correcting a distortion of the image based on the gaze direction information and the information about the heights of the eyes.

Figure 11:
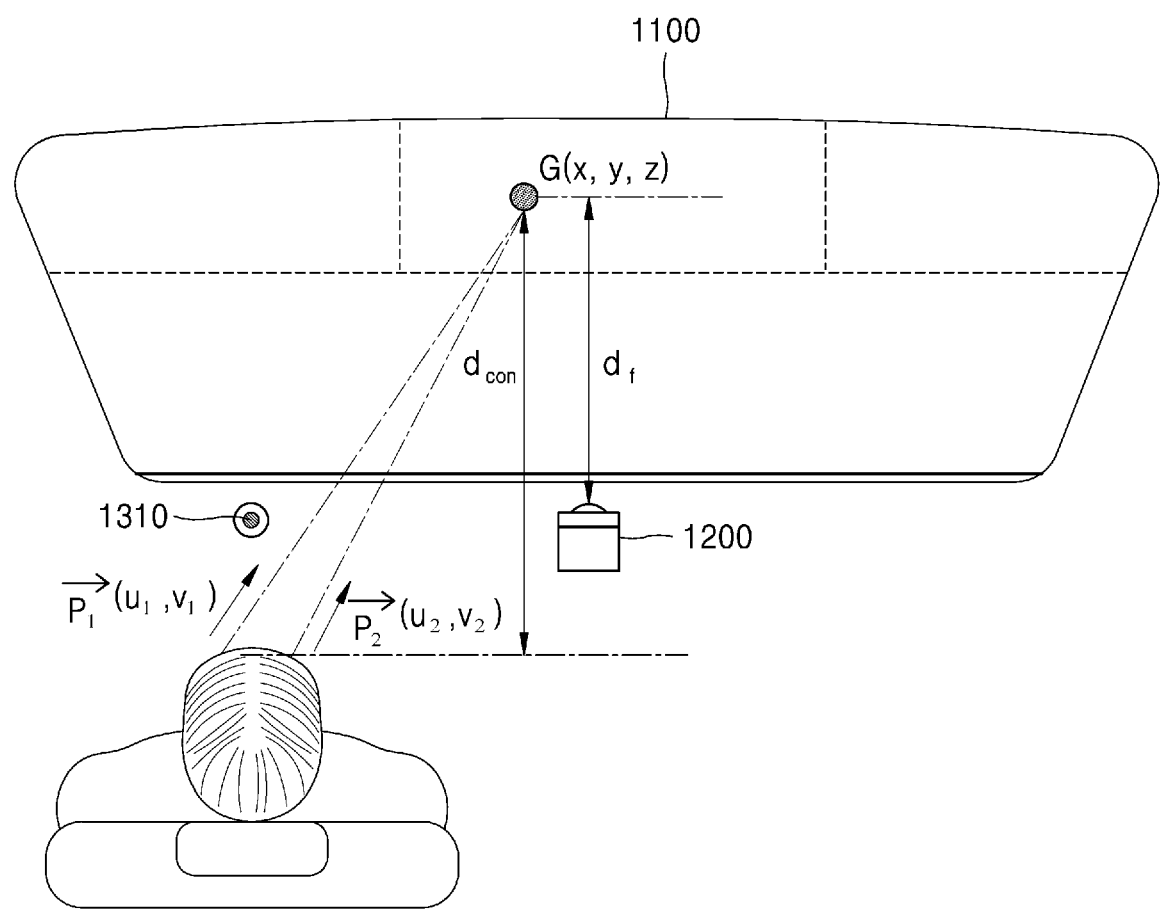
FIG. 11 is a diagram illustrating a method, performed by an electronic device, of adjusting a focal length of an image projected by a projector according to a gaze direction of a driver, according to an embodiment of the disclosure.

FIG. 11 is a diagram illustrating a method, performed by the electronic device 1000, of adjusting a focal length of an image projected by the projector 1200 according to a gaze direction of the driver, according to an embodiment of the disclosure.

Referring to FIG. 11, the electronic device 1000 may obtain information about the first gaze vector $\vec{P}_1$ representing a gaze direction of the left eye of the driver and the second gaze vector $\vec{P}_2$ representing a gaze direction of the right eye of the driver, by using the eye tracking sensor 1310. The processor 1400 (see FIG. 5) of the electronic device 1000 may detect a gaze point G at which the gaze direction of the left eye and the gaze direction of the right eye converge, and obtain three-dimensional position coordinate values (x, y, z) of the gaze point G, based on information about the magnitudes and angles of the first gaze vector $\vec{P}_1$ and the second gaze vector $\vec{P}_2$. The gazing point G refers to a point at which the gaze direction of the left eye and the gaze direction of the right eye converge according to binocular disparity.

The detailed description of the method, performed by the processor 1400, of tracking a gaze direction of the driver by using the eye tracking sensor 1310 and obtaining gaze vector information is the same as that given with reference to FIG. 8A, and thus a repetitive description will be omitted.

The processor 1400 may calculate a vergence distance $d_{con}$, which is the distance between both eyes of the driver and the gaze point G, based on the three-dimensional position coordinate values (x, y, z) of the gaze point G. In an embodiment of the disclosure, the processor 1400 may calculate the vergence distance $d_{con}$ by using triangulation.

The processor 1400 may adjust a focal length $d_f$ of an image projected onto the transparent screen 1100 by the projector 1200, based on the calculated vergence distance $d_{con}$. In an embodiment of the disclosure, the processor 1400 may adjust the focal length $d_f$ of the projector 1200 such that the image appears as if its focus is formed at a position having a depth value equal to or similar to the vergence distance $d_{con}$ on the transparent screen 1100. That is, the electronic device 1000 may set the focal length $d_f$ of the image to a depth less than or equal to a similar range to the depth (e.g., the vergence distance) from both eyes of the driver to the gaze point G. Here, the set depth may cover the case where the focal length $d_f$ of the image is equal to the depth to both eyes of the driver and the gaze point G, and may also include a depth in a range in which the driver may naturally perceive the image.

In an embodiment of the disclosure, the projector 1200 may adjust the focal length $d_f$ at which the focus of the image is formed on the transparent screen 1100, by adjusting the refractive power with respect to light on the light exit surface from which the light of the image is output under the control by the processor 1400.

Figure 12:
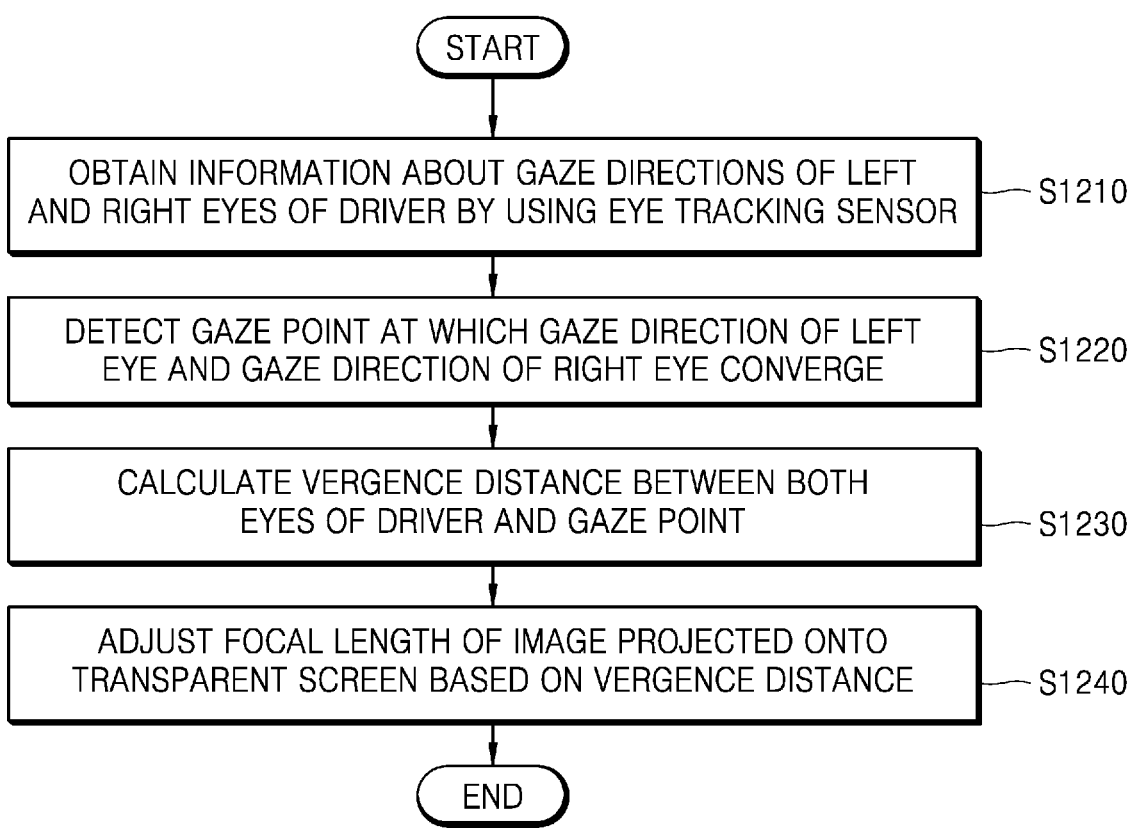
FIG. 12 is a flowchart illustrating a method, performed by an electronic device, of adjusting a focal length of an image projected by a projector according to a gaze direction of a driver, according to an embodiment of the disclosure.

FIG. 12 is a flowchart illustrating a method, performed by the electronic device 1000, of adjusting a focal length of an image projected by the projector according to a gaze direction of the driver, according to an embodiment of the disclosure.

In operation S1210, the electronic device 1000 may obtain information about gaze directions of the left and right eyes of the driver by using the eye tracking sensor.

In operation S1220, the electronic device 1000 may detect a gaze point where the gaze directions of the left eye and the right eye converge. In an embodiment of the disclosure, the electronic device 1000 may detect the gaze point at which the gaze direction of the left eye and the gaze direction of the right eye converge, based on information about the magnitude and angle of each of the first gaze vector representing the gaze direction of the left eye and the second gaze vector representing the gaze direction of the right eye, and obtain information about three-dimensional position coordinate values of the gaze point. The gazing point G refers to a point at which the gaze direction of the left eye and the gaze direction of the right eye converge according to binocular disparity.

In operation S1230, the electronic device 1000 may calculate a vergence distance between both eyes of the driver and the gaze point. In an embodiment of the disclosure, the electronic device 1000 may calculate the vergence distance according to the three-dimensional position coordinate values of the gaze point and the positions of both eyes of the driver, by using a triangulation method.

In operation S1240, the electronic device 1000 may adjust the focal length of the image projected onto the transparent screen based on the vergence distance. In an embodiment of the disclosure, the processor 1400 may adjust the focal length of the projector such that the image appears as if its focus is formed at a position having a depth value equal to or similar to the vergence distance on the transparent screen. The electronic device 1000 may adjust the focal length of the projector by adjusting the refractive power with respect to light on the light exit surface from which the light of the image is output.

Figure 13:
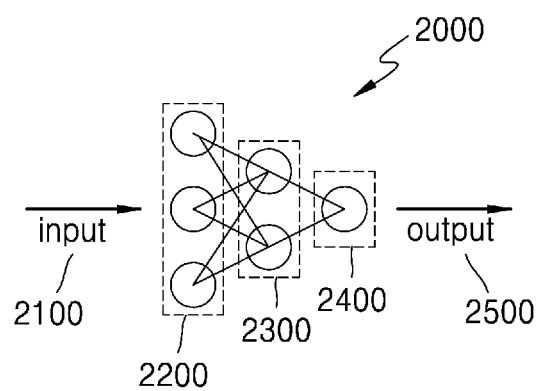
FIG. 13 is a diagram illustrating an operation of an electronic device performed by using artificial intelligence technology, according to an embodiment of the disclosure.

FIG. 13 is a diagram illustrating an operation of the electronic device 1000 performed by using AI technology, according to an embodiment of the disclosure.

Specifically, at least one of the operations of: i) projecting an image onto a transparent screen attached at least a part of a windshield by using a projector, ii) obtaining gaze direction information of the driver by tracking the gaze directions of the left and right eyes of the driver, or iii) performing image warping for correcting a distortion of the image as perceived by the driver may be performed using AI technology for performing computations through a neural network.

AI technology is for obtaining an intended result by performing processing, such as analysis and/or classification, on input data based on computations through a neural network.

Such AI technology may be implemented by using algorithms. In this case, an algorithm or a set of algorithms for implementing AI technology are called a neural network. Here, the neural network may receive input data, perform computations for analysis and classification, and output resultant data. In order for the neural network to accurately output the resultant data corresponding to the input data in this way, training the neural network is needed. Here, 'training' may refer to training the neural network to discover or learn by itself a method of analyzing pieces of input data to the neural network, a method of classifying the pieces of input data, and/or a method of extracting features utilized for generating resultant data from the pieces of input data. Specifically, through a training process, the neural network may be trained based on training data (e.g., a plurality of different images) so as to optimize weight values in the neural network. Then, by processing input data through the neural network having the optimized weight values, an intended result is output.

The neural network may be classified as a deep neural network when a plurality of hidden layers for performing computations are included therein, i.e., when the depth of the neural network for performing computations is increased. Examples of the neural network include, but are not limited to, a CNN, a DNN, an RNN, a restricted Boltzmann machine (RBM), a deep belief network (DBN), a bidirectional recurrent DNN (BRDNN), a deep Q-network, and the like. Also, the neural network may be subdivided. For example, the CNN may be subdivided into a deep convolution neural network (DCNN), a Capsule Neural Network (CapsNet) (not shown), etc.

An 'AI model' may refer to a neural network including at least one layer operating to receive input data and output an intended result. The 'AI model' may also refer to an algorithm or a set of a plurality of algorithms for outputting an intended result by performing computations through a neural network, a processor for executing the algorithm (or the set of algorithms), software for executing the algorithm (or the set of algorithms), or hardware for executing the algorithm (or the set of algorithms).

The at least one of i) projecting an image onto a transparent screen attached to the entire or part of a windshield by using a projector, ii) obtaining gaze direction information of the driver by tracking the gaze directions of the left and right eyes of the driver, or iii) performing image warping for correcting a distortion of the image projected onto the transparent screen based on the obtained gaze direction information of the driver, performed by the electronic device 1000, may be performed based on an AI model.

Referring to FIG. 13, a neural network 2000 may be trained by applying training data as input. Then, the trained neural network 2000 may apply input data 2100 via an input end 2200, and the input end 2200, a hidden layer 2300 and an output end 2400 may analyze the input data 2100 and data transmitted from a previous layer to perform computations for outputting output data 2500. Although FIG. 13 illustrates the hidden layer 2300 as one layer, this is an example, and the hidden layer 2300 may include a plurality of layers.

In an embodiment of the disclosure, the neural network 2000 may be trained to perform image warping for correcting a distortion of an image projected onto the transparent screen, based on gaze direction information of the driver obtained from the eye tracking sensor 1310 (see FIG. 5).

In an embodiment of the disclosure, the neural network 2000 may be trained to calculate a degree of distortion of the image projected onto the transparent screen by using information about gaze vectors of the left and right eyes of the driver, for example, information about the magnitudes, angles, and heights of the gaze vectors, and perform image warping for correcting the projected image based on the calculated degree of distortion of the image.

In an embodiment of the disclosure, the neural network 2000 may be trained to detect the eyes of the driver from a driver image obtained by the camera 1320 (see FIG. 5), obtain position information of the eyes of the driver, and perform image warping based on the obtained position information of the eyes and the gaze direction information of the driver.

In an embodiment of the disclosure, the neural network 2000 may be trained to detect a gaze point at which the gaze direction of the left eye and the gaze direction of the right eye converge, calculates a vergence distance between both eyes of the driver and the gaze point, and adjust the focal length of the image projected onto the transparent screen based on the vergence distance.

In an embodiment of the disclosure, data or program code related to the neural network 2000 configured to perform the at least one of i) projecting an image onto a transparent screen attached to the entire or part of a windshield by using a projector, ii) obtaining gaze direction information of the driver by tracking the gaze directions of the left and right eyes of the driver, or iii) performing image warping for correcting a distortion of the image projected onto the transparent screen based on the obtained gaze direction information of the driver, may be stored in the memory 1500 (see FIG. 5), and training using the neural network 2000 may be performed by the processor 1400 (see FIG. 5).

Alternatively, the neural network 2000 configured to perform the at least one of i) projecting an image onto a transparent screen attached to the entire or part of a windshield by using a projector, ii) obtaining gaze direction information of the driver by tracking the gaze directions of the left and right eyes of the driver, or iii) performing image warping for correcting a distortion of the image projected onto the transparent screen based on the obtained gaze direction information of the driver, may be implemented in a device (not shown) or a processor (not shown) separate from the electronic device 1000.

The computations through the neural network 2000 described above may be performed by a server 3000 (see FIGS. 14 and 15) capable of communicating with the electronic device 1000 according to an embodiment of the disclosure through a wireless communication network. Communication between the electronic device 1000 and the server 3000 will be described with reference to FIGS. 14 and 15.

Figure 14:
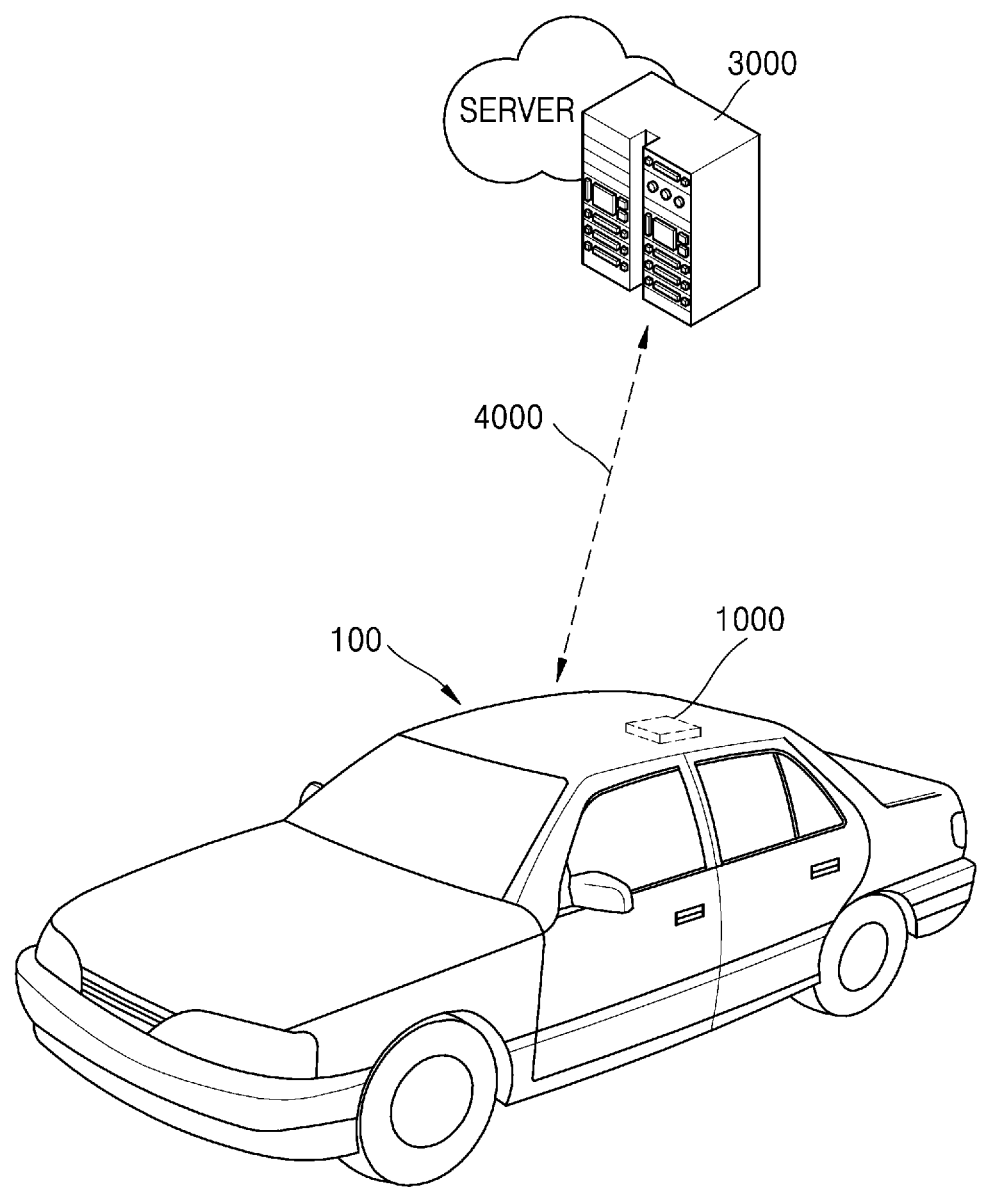
FIG. 14 is a diagram illustrating an electronic device that operates in conjunction with a server, according to an embodiment of the disclosure.

FIG. 14 is a diagram illustrating the electronic device 1000 that operates in conjunction with the server 3000, according to an embodiment of the disclosure.

The server 3000 may transceive data with the electronic device 1000 through a communication network 4000 and process data.

Figure 15:
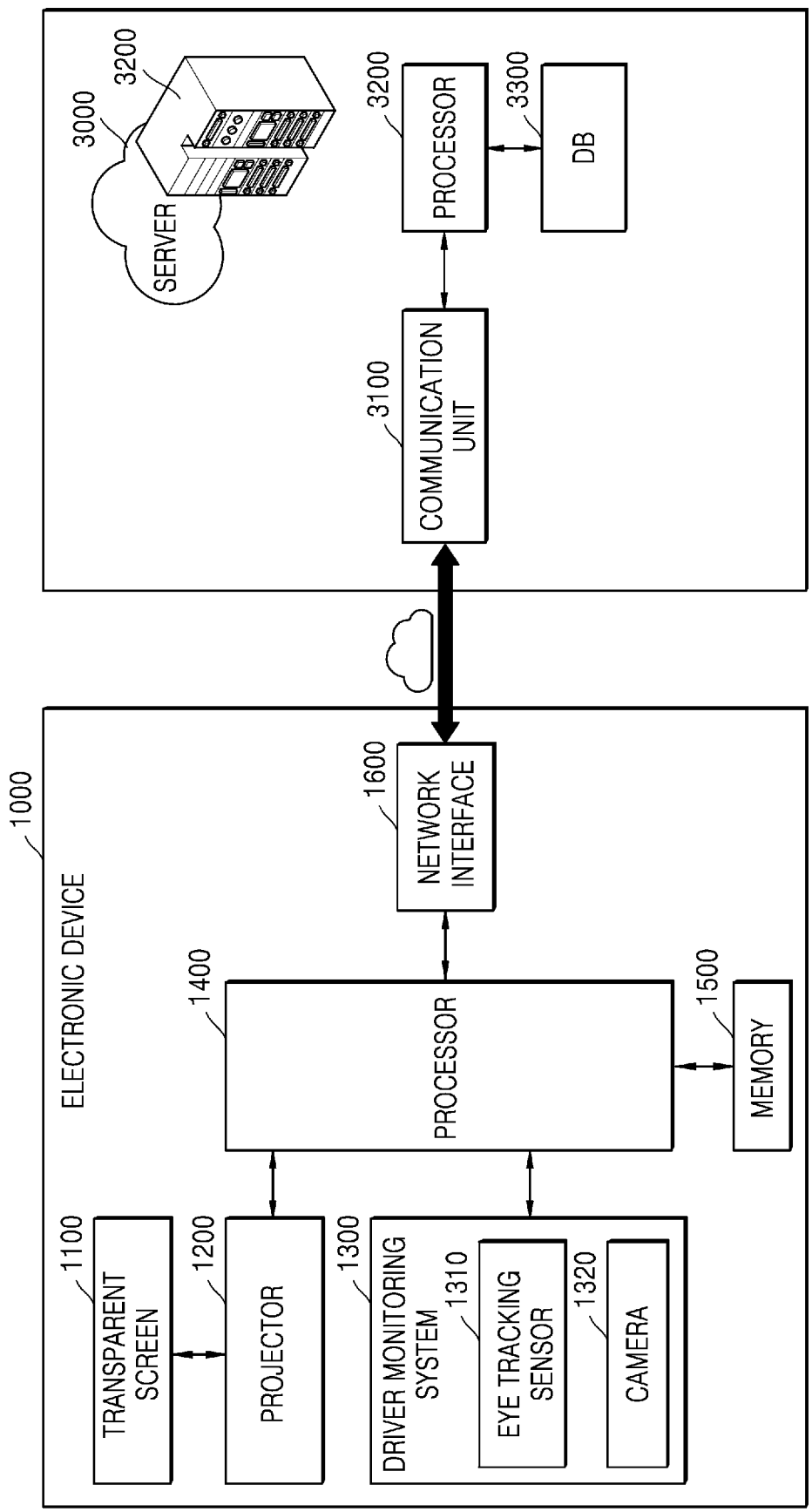
FIG. 15 is a diagram for describing FIG. 14 in detail.

Referring to FIG. 15, the server 3000 may include a communication unit 3100 configured to communicate with the electronic device 1000, a processor 3200 configured to perform at least one instruction, and a database 3300.

The server 3000 may train an AI model and store the trained AI model. In addition, the server 3000 may perform, using the trained AI model, at least one of i) projecting an image onto a transparent screen attached to at least a portion of the windshield by using a projector, ii) obtaining gaze direction information of the driver by tracking the gaze directions of the left and right eyes of the driver, or iii) performing image warping for correcting a distortion of the image as perceived by the driver, based on the obtained gaze direction information of the driver.

In general, the electronic device 1000 may have limited memory capacity, computation processing speed, and training data set collection capability compared to the server 3000. Therefore, an operation using a large data storage and large computational capacities may be performed by the server 3000, and resultant data from the operations may then be transmitted to the electronic device 1000 through a communication network. Accordingly, the electronic device 1000 may rapidly and easily perform an operation despite absence of a large-capacity memory and a high-speed processor, by receiving and using data and AI modeling as executed by the server 3000.

In an embodiment of the disclosure, the server 3000 may include the neural network 2000 described with reference to FIG. 13.

FIG. 15 is a diagram for describing FIG. 14 in detail.

Referring to FIG. 15, the server 3000 may include the communication unit 3100, the processor 3200, and the database 3300.

The communication unit 3100 communicates with an external device through a wireless communication network. Here, the external device (not shown) may include a server capable of performing at least one of computations requested by the electronic device 1000 or transmitting data requested by the electronic device 1000.

The communication unit 3100 includes at least one communication module such as a short-range communication module, a wired communication module, a mobile communication module, and a broadcast reception module. Here, the at least one communication module refers to a communication module capable of performing transmission and reception of data through a tuner performing broadcast reception, or a network conforming to a communication specification such as Bluetooth, wireless local area network (WLAN) (e.g., Wi-Fi), wireless broadband (Wibro), World Interoperability for Microwave Access (Wimax), code-division multiple access (CDMA), wideband CDMA (WCDMA), Internet, 3G, 4G, 5G, and/or communication schemes using millimeter waves (mmWAVE).

For example, when the communication unit 3100 performs communication by using millimeter waves (mm-WAVE), a large amount of data may be quickly transmitted and received. Specifically, a vehicle may increase vehicle safety and/or user convenience by quickly receiving a large amount of data by using millimeter waves, and quickly providing data for the safety of the vehicle (e.g., data for autonomous driving, data for navigation service, etc.), content for users (e.g., movies, music, etc.), and the like.

The mobile communication module included in the communication unit 3100 may perform communication with another remote device (e.g., the electronic device 1000) through a communication network conforming to communication standards such as 3G, 4G, and/or 5G. Here, a communication module configured to perform communication with another remote device may be referred to as a 'long-distance communication module'. In an embodiment of the disclosure, the communication unit 3100 may transmit and receive data to and from a network interface 1600 of the electronic device 1000 by wire or wirelessly.

The processor 3200 controls the overall operation of the server 3000. For example, the processor 3200 may perform operations by executing at least one of at least one instruction or programs of the server 3000.

The database 3300 may include a memory (not shown), and may store, in the memory (not shown), at least one of at least one instruction, program, or data for the server 3000 to perform a certain operation. Also, the database 3300 may store data for the server 3000 to perform computations according to a neural network.

In an embodiment of the disclosure, the server 3000 may store the neural network 2000 described with reference to FIG. 13. The neural network 2000 may be stored in at least one of the processor 3200 or the database 3300. The neural network 2000 included in the server 3000 may be a neural network that has been trained.

In addition, the server 3000 may transmit the neural network that has been trained to the network interface 1600 of the electronic device 1000 through the communication unit 3100. Then, the electronic device 1000 may obtain and store the neural network that has been trained, and may obtain intended output data through the neural network.

A program executable by the electronic device 1000 described herein may be implemented as a hardware component, a software component, and/or a combination of hardware components and software components. The program may be executed by any system capable of executing computer-readable instructions.

Software may include a computer program, code, instructions, or a combination of one or more thereof, and may configure or individually or collectively instruct a processing device to operate in a desired manner.

The software may be implemented as a computer program that includes instructions stored in computer-readable storage media. The computer-readable storage media may include, for example, magnetic storage media (e.g., read-only memories (ROMs), random-access memories (RAMs), floppy disks, hard disks, etc.) and optical storage media (e.g., compact disk read-only memories (CD-ROMs), digital versatile disks (DVDs), etc.). The computer-readable storage media may be distributed in computer systems connected via a network and may store and execute computer-readable code in a distributed manner. The media may be computer-readable, may be stored in a memory, and may be executed by a processor.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium.

In addition, a program according to embodiments of the disclosure may be provided in a computer program product. A computer program product may be traded between a seller and a purchaser as a commodity.

The computer program product may include a software program and a computer-readable storage medium in which the software program is stored. For example, the computer program product may include a product in the form of a software program electronically distributed (e.g., a downloadable application) through a manufacturer of an electronic device or an electronic market (e.g., Google Play Store, App Store). For electronic distribution, at least part of the software program may be stored in a storage medium or temporarily generated. In this case, the storage medium may be a storage medium of a server of the manufacturer of a vehicle or the electronic device 1000, a server of an electronic market, or a relay server that temporarily stores the software program.

The computer program product may include a storage medium of the server 3000 or a storage medium of the electronic device 1000, in a system including the electronic device 1000, the server 3000 (see FIGS. 14 and 15) and other electronic devices. Alternatively, when there is a third device (e.g., a smart phone) communicating with the electronic device 1000, the computer program product may include a storage medium of the third device. Alternatively, the computer program product may include the software program itself, which is transmitted from the electronic device 1000 to an electronic device or the third device or transmitted from the third device to the electronic device.

In this case, one of the electronic device and the third device may execute the computer program product to perform the methods according to embodiments of the disclosure. Alternatively, two or more of the electronic device 1000, the electronic device, and the third device may execute the computer program product to execute the method according to embodiments of the disclosure in a distributed manner.

For example, the electronic device 1000 may execute the computer program product stored in the memory 1500 (see FIG. 5) to control another electronic device communicatively connected to the electronic device 1000 to perform the methods according to embodiments of the disclosure.

As another example, the third device may execute the computer program product to control an electronic device communicatively connected to the third device to perform the method according to embodiments of the disclosure.

When the third device executes the computer program product, the third device may download the computer program product from the electronic device 1000 and execute the downloaded computer program product. Alternatively, the third device may execute the computer program product provided in a pre-loaded state to perform the methods according to embodiments of the disclosure.

Although the embodiments of the disclosure have been described by the limited embodiments of the disclosure and the drawings as described above, various modifications and variations are possible by one of ordinary skill in the art from the above description. For example, the described techniques may be performed in a different order from the described method, and/or components of the described computer system, module, etc. may be combined or integrated in a different form from the described method, or may be replaced or substituted by other components or equivalents to achieve appropriate results.

What is claimed is:

1. An electronic device for projecting an image onto a windshield of a vehicle, the electronic device comprising:
    a transparent screen, attached to at least a part of the windshield, and configured to refract light of a projection towards a driver of the vehicle, wherein the transparent screen includes a first region having a first angle pattern having a first inclination angle protruding from a surface of a layer of the first region, and a second region horizontally adjacent to the first region having a second angle pattern having a second inclination angle different from the first inclination angle protruding from a surface of a layer of the second region;
    a projector configured to project the image onto the transparent screen;
    an eye tracking sensor configured to detect a gaze direction of the driver by tracking left and right eyes of the driver;
    a memory storing a program including one or more instructions for controlling the electronic device; and
    a processor configured to execute the one or more instructions to cause the electronic device to:
        perform image warping for correcting a distortion of the image based at least on the detected gaze direction from the eye tracking sensor and the first inclination angle and the second inclination angle of the transparent screen with the windshield, as perceivable by the driver when projected onto the transparent screen.

2. The electronic device of claim 1, wherein the processor is further configured to execute the one or more instructions to:
    obtain, via the eye tracking sensor, gaze vectors representing respective gaze directions of the left and right eyes, and
    detect magnitudes, angles, and heights of the obtained gaze vectors.

3. The electronic device of claim 2, wherein the processor is further configured to:
execute the one or more instructions to calculate a degree of distortion of the image when projected onto the transparent screen using the detected magnitudes, angles, and heights of the obtained gaze vectors, and perform image warping on the image based at least on the calculated degree of distortion, to correct the distortion of the image when projected onto the transparent screen.

4. The electronic device of claim 1, further comprising a camera configured to capture an image including the driver,
wherein the processor is further configured to execute the one or more instructions to:
detect positions of each of the left and right eyes of the driver using at least the captured image including the driver,
the image warping is performed further based on the detected positions of the each of the left and right eyes, in addition to the detected gaze direction.

5. The electronic device of claim 1, wherein the processor is further configured to execute the one or more instructions to
determine a gaze point at which the gaze directions of the left eye and the right eye of the driver converge,
calculate a vergence distance between both eyes of the driver and the gaze point, and
control the projector to adjust, based on the calculated vergence distance, a focal length of the image projected onto the transparent screen.

6. The electronic device of claim 1, wherein the transparent screen is divided into a plurality of regions, and
wherein the plurality of inclination angle patterns each have different angles, according to each of the plurality of regions in which they are respectively disposed.

7. The electronic device of claim 6, wherein the processor is further configured to:
divide the transparent screen into a plurality of regions, and
control the projector to project a different image for each region of the plurality of regions.

8. A method of projecting an image onto a windshield of a vehicle, the method comprising:
projecting, via a projector, the image onto a transparent screen attached to at least a part of the windshield, wherein the transparent screen includes a first region having a first angle pattern having a first inclination angel protruding from a surface of a layer of the first region, and a second region horizontally adjacent to the first region having a second angle pattern having a second inclination angle different form the first inclination angle protruding from a surface of a layer of the second region for refracting light;
detecting a gaze direction of a driver by tracking, via an eye tracking sensor, left and right eyes of a driver of the vehicle; and
performing image warping, via the processor, for correcting a distortion of the image based at least on the detected gaze direction from the eye tracking sensor and the first inclination angle and the second inclination angle of the transparent screen with the windshield, as perceivable by the driver when the image is projected onto the transparent screen.

9. The method of claim 8, wherein detecting the gaze direction of the driver further comprises:
obtaining, via the eye tracking sensor, gaze vectors representing the respective gaze directions of the left and right eyes of the driver; and
detecting, via the processor, magnitudes, angles, and heights of the obtained gaze vectors.

10. The method of claim 9, further comprising:
calculating, via the processor, a degree of distortion of the image when projected onto the transparent screen using the detected magnitudes, angles, and heights of the obtained gaze vectors,
wherein performing the image warping includes warping the image based at least on the calculated degree of distortion, to correct the distortion of the image when projected onto the transparent screen.

11. The method of claim 8, further comprising:
capturing an image including the driver, via a camera; and
detecting, via the processor, positions of each of the left and right eyes of the driver using at least the captured image including the driver,
wherein performing the image warping is performed further based on the detected positions of the each of the left and right eyes, in addition to the detected gaze direction.

12. The method of claim 8, wherein the transparent screen is divided into a plurality of regions, and
wherein the plurality of inclination angle patterns each have different angles, according to each of the plurality of regions in which they are respectively disposed.

13. The method of claim 12, further comprising:
dividing, via the processor, the transparent screen into the plurality of regions,
wherein projecting the image further includes displaying a different image for each region of the plurality of regions.

* * * * *